US012763658B2

(12) United States Patent
Ying et al.

(10) Patent No.: US 12,763,658 B2
(45) Date of Patent: Oct. 13, 2026

(54) STANDBY METHOD FOR SWITCHING POWER SUPPLY, SWITCHING POWER SUPPLY, AND PRIMARY AND SECONDARY CONTROL CIRCUITS

(71) Applicant: Diodes Incorporated, Plano, TX (US)

(72) Inventors: Zheng Ying, Shanghai (CN); Sen Dou, Shanghai (CN); Andong Zhao, Shanghai (CN); Feng Wang, Shanghai (CN)

(73) Assignee: DIODES INCORPORATED, Plano, TX (US)

( * ) Notice: Subject to any disclaimer, the term of this patent is extended or adjusted under 35 U.S.C. 154(b) by 184 days.

(21) Appl. No.: 18/673,943

(22) Filed: May 24, 2024

(65) Prior Publication Data

US 2024/0396422 A1 Nov. 28, 2024

Related U.S. Application Data

(63) Continuation of application No. PCT/CN2023/119962, filed on Sep. 20, 2023.

(30) Foreign Application Priority Data

May 26, 2023 (CN) ........................ 202310609210.X

(51) Int. Cl.
*H02M 1/00* (2007.01)
*H02M 3/335* (2006.01)

(52) U.S. Cl.
CPC ....... *H02M 1/0032* (2021.05); *H02M 1/0035* (2021.05); *H02M 3/33523* (2013.01); *H02M 3/33507* (2013.01)

(58) Field of Classification Search
CPC ............. H02M 1/0032; H02M 1/0035; H02M 3/33507; H02M 3/33523
See application file for complete search history.

(56) References Cited

U.S. PATENT DOCUMENTS

| | | | |
|---|---|---|---|
| 9,941,800 | B2 | 4/2018 | Pastrana et al. |
| 11,281,272 | B2 | 3/2022 | Lee et al. |

(Continued)

FOREIGN PATENT DOCUMENTS

| | | | |
|---|---|---|---|
| CN | 111525801 | A | 8/2020 |
| JP | 2010063293 | A | 3/2010 |

(Continued)

OTHER PUBLICATIONS

Extended European Search Report for European Application No. 24173810.3, mailed Nov. 12, 2024, 12 pages.

(Continued)

*Primary Examiner* — Jue Zhang
(74) *Attorney, Agent, or Firm* — Kilpatrick Townsend & Stockton LLP

(57) ABSTRACT

A standby method for a switching power supply may be applied to a switching power supply provided with an optical coupler circuit. The method includes: upon detecting a mode control signal indicating that a load device power supply demand is greater than a preset value, entering a first mode, and controlling output voltage of the switching power supply by means of an optical coupler circuit; and upon detecting a mode control signal indicating that the load device power supply demand is less than or equal to the preset value, entering a second mode, turning off a bias current of the optical coupler circuit, and controlling the output of the switching power supply by means of a driving pulse signal, so as to reduce bias currents of a primary side and a secondary side of the switching power supply, and reduce standby power consumption of the switching power supply.

18 Claims, 9 Drawing Sheets

(56) References Cited

U.S. PATENT DOCUMENTS

| | | | | |
|---|---|---|---|---|
| 2013/0215651 A1* | 8/2013 | Liao | H02M 5/40 363/34 |
| 2013/0301310 A1 | 11/2013 | Wang et al. | |
| 2014/0078789 A1 | 3/2014 | Li et al. | |
| 2022/0085726 A1 | 3/2022 | Kong et al. | |

FOREIGN PATENT DOCUMENTS

| | | |
|---|---|---|
| JP | 4488132 B2 | 6/2010 |
| TW | I574499 B | 3/2017 |
| TW | I599160 B | 9/2017 |
| TW | I733483 B | 7/2021 |
| TW | I792036 B | 2/2023 |
| TW | I796054 B | 3/2023 |
| TW | I798785 B | 4/2023 |

OTHER PUBLICATIONS

Office Action and Search Report from Taiwan Patent Application No. 112142541, dated Jun. 24, 2024, 9 pages.
Office Action for European Patent Application No. 24173810.3, mailed Sep. 24, 2025, 7 pages.
Office Action for Japanese Patent Application No. 2024-527474, mailed Oct. 7, 2025, 15 pages.
ST Life.Augmented: "TA0357—Overview of USB Type-C and Power Delivery technologies", May 2018, XP093316202, 17 pages, Retrieved from the Internet: URL:https://www.st.com/resource/en/technical_article/ta0357-overview-ofusb-typec-and-power-delivery-technologies-stmicroelectronics.pdf.

* cited by examiner

STANDBY METHOD FOR SWITCHING POWER SUPPLY, SWITCHING POWER SUPPLY, AND PRIMARY AND SECONDARY CONTROL CIRCUITS

CROSS-REFERENCES TO RELATED APPLICATIONS

This application is a continuation of International Patent Application No. PCT/CN2023/119962, filed Sep. 20, 2023 and entitled "A Realization Method of Reducing Standby Power Consumption of AC/DC Power Supply", which claims priority to Chinese Patent Application No. 202310609210.X, filed on May 26, 2023 and entitled "Standby Method for Switching Power Supply, Switching Power Supply, and Primary and Secondary Control Circuits", the disclosures of which are hereby incorporated by reference in their entirety.

TECHNICAL FIELD

The present invention relates to the technical field of switching power supplies, and more particularly to a standby method for a switching power supply, a switching power supply, and primary and secondary control circuits.

BACKGROUND

FIG. 1 is a structural diagram of an existing switching power supply, which, as shown in FIG. 1, is specifically an alternating current/direct current secondary side regulation (AC/DC SSR). The existing AC/DC SSR generally uses a voltage control loop (CV) or a current control loop (CC) and a current signal flowing through an optical coupler (OC) to cause a switching power supply to maintain a stable state in a constant-voltage constant-current control mode. Application of the switching power supply generally requires a load to be attached thereto, so that corresponding operation control is performed on the basis of the load. When the switching power supply is in a standby state, there are generally a case where the load is attached to the switching power supply and a case where the load is detached from the switching power supply. When the conventional switching power supply is in the standby state, regardless of whether the load is attached to the switching power supply, a burst mode (BM) is used to reduce standby power consumption. In this case, bias currents of the primary side and the secondary side of the switching power supply flowing through the optical coupler are both maximum values, so that the standby power consumption of the switching power supply is very large, and in addition, the standby power consumption cannot be further reduced due to the large bias current.

In view of the above problems, how to avoid the effect of the bias current so as to further reduce standby power consumption of a switching power supply is a problem that those skilled in the art try to solve.

SUMMARY

An objective of the present invention is to provide a standby method for a switching power supply, a switching power supply, and primary and secondary control circuits, so as to avoid the effect of a bias current, and further reduce standby power consumption of a switching power supply.

To solve the above technical problem, provided in the present invention is a standby method for a switching power supply, applied to a switching power supply provided with an optical coupler circuit, the method comprising: upon detecting a mode control signal indicating that a load device power supply demand is greater than a preset value, entering, by the switching power supply, a first mode, and controlling output of the switching power supply by means of the optical coupler circuit; and upon detecting a mode control signal indicating that the load device power supply demand is less than or equal to the preset value, entering, by the switching power supply, a second mode, turning off a bias current of the optical coupler circuit, and controlling the output of the switching power supply by means of a driving pulse signal, so as to reduce bias currents of a primary side and a secondary side of the switching power supply, and reduce standby power consumption of the switching power supply.

In another aspect, the entering a second mode comprises: generating, according to the bias current of the optical coupler circuit, a notification signal indicating that the switching power supply has entered the second mode; and controlling, according to a notification signal maintained for a first preset time length, a secondary side control chip to enter the second mode.

In another aspect, the entering a second mode comprises: when a primary side control chip acquires that a level signal of a voltage signal outputted by the optical coupler circuit has been inverted and a retention time length of the inverted level signal has reached a time threshold, controlling the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In another aspect, the turning off a bias current of the optical coupler circuit, and controlling the output of the switching power supply by means of a driving pulse signal comprises: when the primary side control chip acquires an output undervoltage signal indicating that an output voltage is in an undervoltage state, outputting the driving pulse signal at the primary side control chip; and adjusting the output of the switching power supply according to the driving pulse signal, so that the switching power supply is in the second mode.

In another aspect, the primary side control chip acquiring an output undervoltage signal indicating that an output voltage is in an undervoltage state comprises: determining whether an output voltage in the secondary side control chip is less than a first preset output voltage; and if so, transmitting the output undervoltage signal to the primary side control chip; or if not, skipping outputting the output undervoltage signal.

In another aspect, the method further comprises: when the primary side control chip is within a preset resonance time, blocking detection on the primary side control chip.

In another aspect, after the controlling the output of the switching power supply by means of a driving pulse signal, the method further comprises: when the secondary side control chip acquires the mode control signal indicating that the load device power supply demand is greater than the preset value, outputting, by means of a transformer, a wake-up signal which has a preset frequency and which indicates exiting the second mode, controlling the secondary side control chip to stop outputting the wake-up signal, and controlling, according to the wake-up signal, the secondary side control chip to exit the second mode.

In another aspect, after the outputting, by means of a transformer, a wake-up signal which has a preset frequency and which indicates exiting the second mode, the method further comprises: when it is determined that the preset frequency of the wake-up signal is less than a frequency threshold, controlling the primary side control chip to exit the second mode.

In another aspect, the turning off a bias current of the optical coupler circuit, and controlling the output of the switching power supply by means of a driving pulse signal comprises: when an input voltage of an auxiliary winding of the primary side is adjusted to be within a preset range, outputting the driving pulse signal at the primary side control chip; and adjusting the output of the switching power supply according to the driving pulse signal and a relationship between the input voltage and the output voltage, so that the switching power supply is in the second mode.

In another aspect, the adjusting the output of the switching power supply according to the driving pulse signal and a relationship between the input voltage and the output voltage comprises: adjusting the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side.

In another aspect, after the controlling the output of the switching power supply by means of a driving pulse signal, the method further comprises: when the level signal of the voltage signal outputted by the optical coupler circuit and acquired by the primary side control chip is inverted and a retention time length of the inverted level signal reaches a second preset time length, controlling the secondary side control chip to stop outputting the wake-up signal, and controlling, according to the wake-up signal, the primary side control chip to exit the second mode.

In another aspect, the method further comprises: controlling, according to a notification signal maintained for a third preset time length, the secondary side control chip to exit the second mode.

To solve the above technical problem, further provided in the present invention is a switching power supply, an optical coupler circuit being coupled between a primary side and a secondary side, the switching power supply further comprising: a mode signal generating circuit, configured to measure a load device power supply demand of the switching power supply, and generate a second mode control signal when the load device power supply demand is less than or equal to a preset value; an optical coupler control circuit, configured to control, according to the second mode control signal, a bias current of the optical coupler circuit to be turned off; and a switching power supply output control circuit, configured to generate a first mode control signal when the load device power supply demand is greater than the preset value, control, according to the first mode control signal, the switching power supply to enter a first mode, control output of the switching power supply by means of the optical coupler circuit, control, according to the second mode control signal, the switching power supply to enter a second mode, and control the output of the switching power supply by means of a driving pulse signal, so as to reduce bias currents of the primary side and the secondary side of the switching power supply, and reduce standby power consumption of the switching power supply.

In another aspect, when the switching power supply enters the first mode, the output of the switching power supply is controlled to be stable by adjusting the bias current of the optical coupler circuit.

In another aspect, the switching power supply output control circuit comprises: a notification signal control circuit, configured to generate a notification signal upon receiving the second mode control signal, and configured to notify the primary side control chip to enter or exit the second mode, so that the switching power supply controls the output of the switching power supply by means of the driving pulse signal, so as to reduce the bias currents of the primary side and the secondary side of the switching power supply, and reduce the standby power consumption of the switching power supply; and a primary mode control circuit, configured to receive the notification signal, and control, on the basis of the notification signal, the primary side control chip to change an operation mode, the operation mode comprising the first mode or the second mode, wherein when the load device power supply demand is greater than the preset value, the switching power supply enters the first mode, and the output of the switching power supply is controlled by means of the optical coupler circuit.

In another aspect, the notification signal control circuit comprises: a first second-mode-entering control circuit, configured to generate, according to the bias current of the optical coupler circuit, the notification signal indicating that the switching power supply has entered the second mode, and control, according to the notification signal maintained for a first preset time length, a secondary side control chip to enter the second mode.

In another aspect, the notification signal control circuit further comprises: a second second-mode-entering control circuit, configured to control, when the primary side control chip acquires that a level signal of a voltage signal outputted by the optical coupler circuit has been inverted and a retention time length of the inverted level signal has reached a time threshold, the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In another aspect, the primary mode control circuit comprises: a first second-mode-maintaining control circuit, configured to output, at the primary side control chip, the driving pulse signal when the primary side control chip acquires an output undervoltage signal indicating that an output voltage is in an undervoltage state, and adjust the output of the switching power supply according to the driving pulse signal, so that the switching power supply is in the second mode.

In another aspect, the primary mode control circuit further comprises: a first determination circuit, configured to determine whether the output voltage in the secondary side control chip is less than a first preset output voltage, and when the output voltage is less than the first preset output voltage, transmit the output undervoltage signal to the primary side control chip.

In another aspect, the switching power supply further comprises: a first blocking circuit, configured to block, when the primary side control chip is within a preset resonance time, detection on the primary side control chip.

In another aspect, the notification signal control circuit further comprises: a first secondary second-mode-exiting control circuit, configured to output, by means of a transformer when the secondary side control chip acquires the mode control signal indicating that the load device power supply demand is greater than the preset value, the wake-up signal which has a preset frequency and which indicates exiting the second mode, control the secondary side control chip to stop outputting the wake-up signal, and control, according to the wake-up signal, the secondary side control chip to exit the second mode.

In another aspect, the notification signal control circuit further comprises: a first primary second-mode-exiting control circuit, configured to control, when it is determined that the preset frequency of the wake-up signal is less than a frequency threshold, the primary side control chip to exit the second mode.

In another aspect, the primary mode control circuit further comprises: a second second-mode-maintaining control circuit, configured to output, at the primary side control chip, the driving pulse signal when an input voltage of an auxiliary winding of the primary side is adjusted to be within a preset range, and adjust the output of the switching power supply according to the driving pulse signal and a relationship between the input voltage and the output voltage, so that the switching power supply is in the second mode.

In another aspect, the primary mode control circuit further comprises: a first adjusting circuit, configured to adjust the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side.

In another aspect, the notification signal control circuit further comprises: a second primary second-mode-exiting control circuit, configured to control, when the level signal of the voltage signal outputted by the optical coupler circuit and acquired by the primary side control chip is inverted, and a retention time length of the inverted level signal reaches a second preset time length, the secondary side control chip to stop outputting the wake-up signal, and control, according to the wake-up signal, the primary secondary side control chip to exit the second mode.

In another aspect, the notification signal control circuit further comprises: a second secondary second-mode-exiting control circuit, configured to control, according to the notification signal maintained for a third preset time length, the secondary side control chip to exit the second mode.

In another aspect, the mode signal generating circuit comprises at least a mode control signal interface a second mode control unit, and the mode control signal interface is configured to correspondingly transmit, to the second mode control unit, the mode control signal indicating that the load device power supply demand is greater than the preset value.

In another aspect, the optical coupler control circuit comprises at least a secondary first switching transistor and a secondary second switching transistor, a first end of the secondary first switching transistor being connected to the optical coupler circuit, a second end of the secondary first switching transistor being grounded, a control end of the secondary first switching transistor being connected to a first end of the secondary second switching transistor, a second end of the secondary second switching transistor being grounded, and a control end of the secondary second switching transistor being connected to the second mode unit.

To solve the above technical problem, further provided in the present invention is a secondary control circuit of a switching power supply, an optical coupler circuit being coupled between a primary side and a secondary side of the switching power supply, the secondary control circuit comprising: a mode signal generating circuit, configured to measure a load device power supply demand of the switching power supply, and generate a second mode control signal when the load device power supply demand is less than or equal to a preset value; an optical coupler control circuit, configured to control, according to the second mode control signal, a bias current of the optical coupler circuit to be turned off; and a notification signal control circuit, configured to generate a notification signal upon receiving the second mode control signal, and configured to notify a primary side control chip to enter or exit a second mode, so that the switching power supply controls output of the switching power supply by means of a driving pulse signal, so as to reduce bias currents of the primary side and the secondary side of the switching power supply, and reduce standby power consumption of the switching power supply.

In another aspect, the notification signal control circuit comprises: a third second-mode-entering control circuit, configured to generate, according to the bias current of the optical coupler circuit, the notification signal indicating that the switching power supply has entered the second mode, and control, according to the notification signal maintained for a first preset time length, a secondary side control chip to enter the second mode.

In another aspect, the notification signal control circuit further comprises: a fourth second-mode-entering control circuit, configured to control, when the primary side control chip acquires that a level signal of a voltage signal outputted by the optical coupler circuit has been inverted and a retention time length of the inverted level signal has reached a time threshold, the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In another aspect, the notification signal control circuit further comprises: a third secondary second-mode-exiting control circuit, configured to output, by means of a transformer when the secondary side control chip acquires the mode control signal indicating that the load device power supply demand is greater than the preset value, the wake-up signal which has a preset frequency and which indicates exiting the second mode, control the secondary side control chip to stop outputting the wake-up signal, and control, according to the wake-up signal, the secondary side control chip to exit the second mode.

In another aspect, the notification signal control circuit further comprises: a third primary second-mode-exiting control circuit, configured to control, when it is determined that the preset frequency of the wake-up signal is less than a frequency threshold, the primary side control chip to exit the second mode.

In another aspect, the notification signal control circuit further comprises: a fourth primary second-mode-exiting control circuit, configured to control, when the level signal of the voltage signal outputted by the optical coupler circuit and acquired by the primary side control chip is inverted, and a retention time length of the inverted level signal reaches a second preset time length, the secondary side control chip to stop outputting the wake-up signal, and control, according to the wake-up signal, the primary secondary side control chip to exit the second mode.

In another aspect, the notification signal control circuit further comprises: a fourth secondary second-mode-exiting control circuit, configured to control, according to the notification signal maintained for a third preset time length, the secondary side control chip to exit the second mode.

To solve the above technical problem, further provided in the present invention is a primary control circuit of a switching power supply, an optical coupler circuit being coupled between a primary side and a secondary side of the switching power supply, the primary control circuit comprising: a driving pulse signal generating circuit, coupled to a power switch of the switching power supply, and configured to generate a driving pulse signal to control the turning on and off of the power switch; and a primary mode control circuit, configured to receive a notification signal, and control, on the basis of the notification signal, a primary side control chip to change an operation mode.

In another aspect, the primary mode control circuit comprises: a third second-mode-maintaining control circuit, configured to output, at the primary side control chip, the driving pulse signal when the primary side control chip acquires an output undervoltage signal indicating that an output voltage is in an undervoltage state, and adjust output of the output voltage switching power supply according to the driving pulse signal, so that the switching power supply is in the second mode.

In another aspect, the primary mode control circuit further comprises: a second determination circuit, configured to determine whether an output voltage in a secondary side control chip is less than a first preset output voltage, and when the output voltage is less than the first preset output voltage, transmit the output undervoltage signal to the primary side control chip.

In another aspect, the switching power supply further comprises: a second blocking circuit, configured to block, when the primary side control chip is within a preset resonance time, detection on the primary side control chip.

In another aspect, the primary mode control circuit further comprises: a fourth second-mode-maintaining control circuit, configured to output, at the primary side control chip, the driving pulse signal when an input voltage of an auxiliary winding of the primary side is adjusted to be within a preset range, and adjust the output of the switching power supply according to the driving pulse signal and a relationship between the input voltage and the output voltage, so that the switching power supply is in the second mode.

In another aspect, the primary mode control circuit further comprises: a second adjusting circuit, configured to adjust the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side.

Provided in the present invention is a standby method for a switching power supply. The method is applied to a switching power supply provided with an optical coupler circuit, and comprises: upon detecting a mode control signal indicating that a load device power supply demand is greater than a preset value, entering, by the switching power supply, a first mode, and controlling output of the switching power supply by means of the optical coupler circuit; and upon detecting a mode control signal indicating that the load device power supply demand is less than or equal to the preset value, entering, by the switching power supply, a second mode, turning off a bias current of the optical coupler circuit, and controlling the output of the switching power supply by means of a driving pulse signal, so as to reduce bias currents of a primary side and a secondary side of the switching power supply, and reduce standby power consumption of the switching power supply. In this case, the bias current of the optical coupler circuit is turned off, so that the bias currents of the primary side and the secondary side are both 0, thereby reducing the bias current, reducing quiescent loss, and further reducing standby power consumption.

Also provided in the present invention are a standby method for a switching power supply, a switching power supply, and primary and secondary control circuits. The effect is the same as the above effect.

BRIEF DESCRIPTION OF THE DRAWINGS

In order to more clearly describe the embodiments of the present invention, accompanying drawings to be used in the embodiments are briefly introduced below. Obviously, the accompanying drawings in the following description are merely some of the embodiments of the present invention. Those of ordinary skill in the art can further obtain other accompanying drawings according to these accompanying drawings without involving inventive skill.

DETAILED DESCRIPTION OF THE EMBODIMENTS

The technical solutions in the embodiments of the present invention are clearly and completely described below with reference to the accompanying drawings in the embodiments of the present invention. It is apparent that the described embodiments are merely some, rather than all, of the embodiments of the present invention. On the basis of the embodiments in the present invention, all other embodiments obtained by those of ordinary skill in the art without involving inventive skill fall within the scope of protection of the present invention.

A core of the present invention is to provide a standby method for a switching power supply, a switching power supply, and primary and secondary control circuits, which can avoid an effect of a bias current, and further reduce standby power consumption of a switching power supply.

In order to enable those in the art to better understand the solution of the present invention, the present invention is described in further detail below with reference to the accompanying drawings and specific embodiments.

Figure 1:
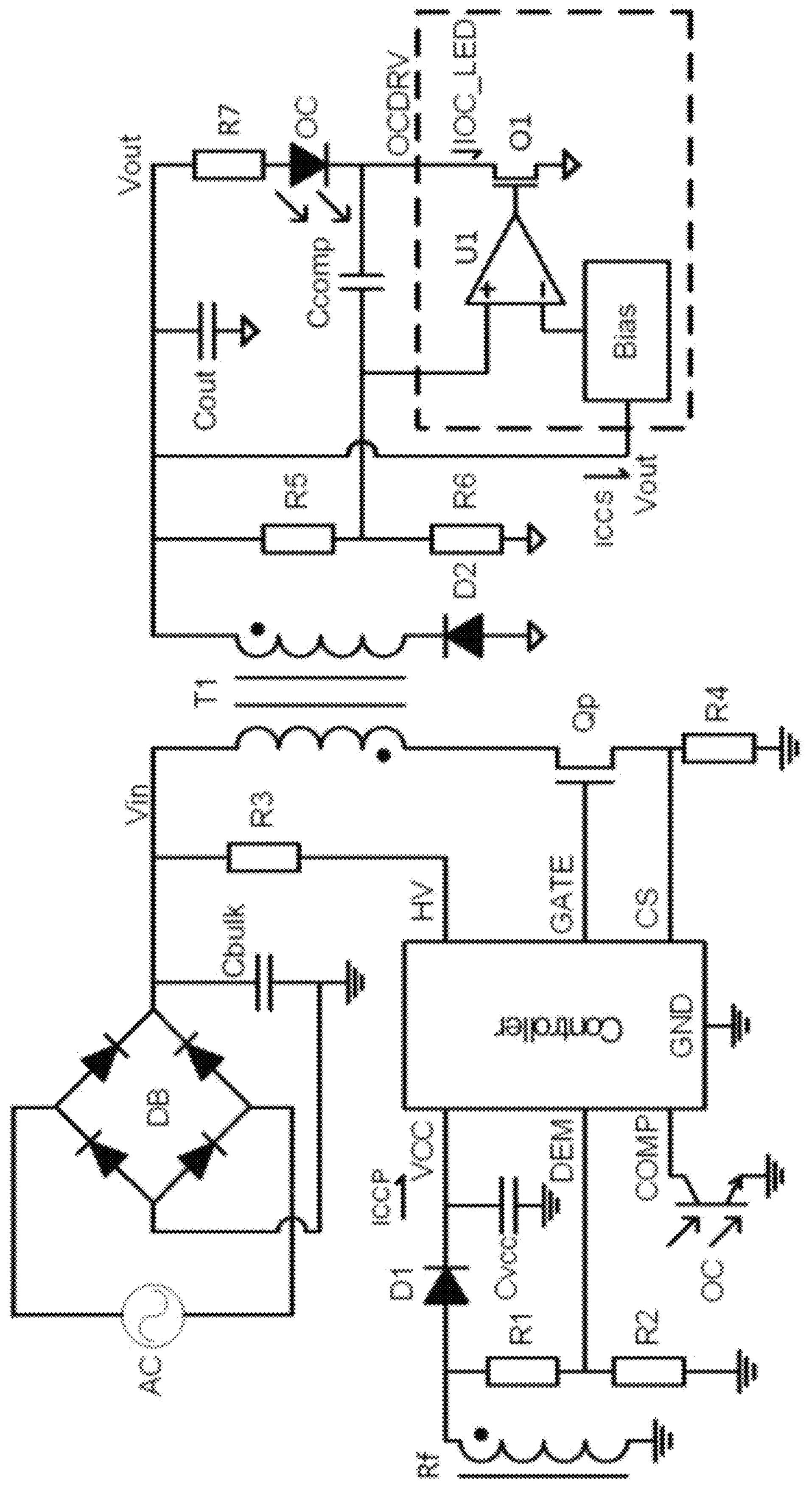
FIG. 1 (Prior Art)
FIG. 1 a structural diagram of an existing switching power supply.
Figure 2:
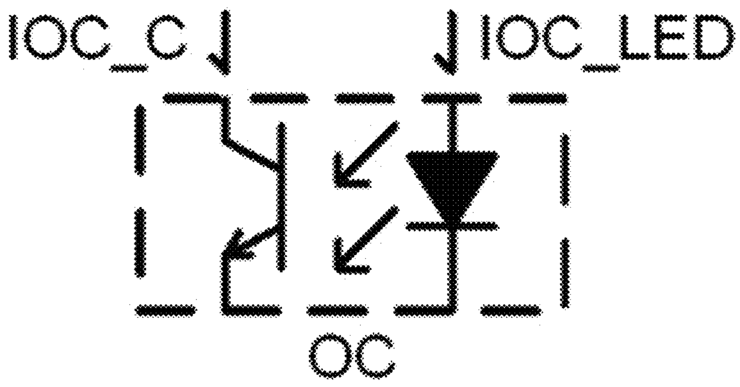
FIG. 2 is a structural diagram of an OC device.

FIG. 1 is a structural diagram of an existing switching power supply. As shown in FIG. 1, a primary side and a secondary side of a transformer T1 are defined in the switching power supply. The primary side of the switching power supply is generally composed of an alternating current power supply AC, a rectifier bridge DB, an input capacitor Cbulk, a starting resistor R3, a primary coil (which may also be referred to as a primary winding) of the transformer T1, an NMOS transistor Qp (which may also be referred to as a power switch and is coupled to the primary winding of the transformer T1), a current sampling resistor R4, a control chip Controller, a rectifier diode D1, and a triode portion of an OC device. It should also be noted that as a more preferred embodiment, a voltage dividing resistor R1, a voltage dividing resistor R2, a voltage stabilizing capacitor Cvcc, and an auxiliary winding Rf are further provided. The control chip is further provided with six pins respectively denoted as DEM, HV, VCC, COMP, GATE, and CS. The secondary side of the switching power supply is generally composed of a voltage dividing resistor R5, a voltage dividing resistor R6, a voltage stabilizing capacitor Cout, a resistor R7 connected to an output end, a diode portion of the OC device, a compensation capacitor Ccomp, a transistor Q1, an amplifier U1, a Bais module, a rectifier diode D2, and a secondary coil (which may also be referred to as a secondary winding) of the transformer T1. The transistor Q1, the amplifier U1, and the Bais module constitute a secondary OC controller OCRDV. OCRDV is generally referred to as a secondary controller (a secondary side control chip), and Controller is generally referred to as a primary controller (a primary side control chip). FIG. 2 is a structural diagram of an OC device. As shown in FIG. 2, the left side of the OC device is a triode portion, and the right side is a diode portion. In addition, the triode portion is generally provided on the primary side, and the diode portion is generally provided on the secondary side. It can be understood that in actual production and application, the OC device is an integrated device, but for ease of description, is shown in a split manner in a schematic diagram thereof drawn in the field of circuits. It should also be noted that a triode in the OC device is generally an NPN transistor. In addition, a bias current flowing through the OC device on the primary side is represented by IOC_C, and a bias current flowing through the OC device on the secondary side is represented by IOC_LED. The OC device is an optical coupler device, so that a diode on the secondary side is an LED lamp, and the diode emits light when a current flows therethrough. It can be understood that the above description of the OC device is merely one of many embodiments, and a specific implementation thereof may be determined according to an implementation scenario, which is not limited in the present invention.

For an output end of a switching power supply in a standby state, a load may generally be in two cases. In one of the two cases, the load is attached to the switching power supply (in this case, a load device power supply demand is greater than a preset value). For case of understanding, the case may be understood as that when a mobile phone is charged via the switching power supply, the mobile phone is fully charged but is not disconnected from the switching power supply. It can be understood that when the mobile phone is connected to the switching power supply, a light load case and a heavy load case are further present. Specifically, a load case may be determined by setting a preset value related to the load, and certainly, implementations thereof may also be determined according to implementation scenarios. In the other one of the two cases, the load is detached from the switching power supply (in this case, the load device power supply demand is less than or equal to the preset value). For case of understanding, in this case, it can be understood that when a mobile phone is charged via the switching power supply, the fully charged mobile phone is disconnected from the switching power supply. In this case, whether the mobile phone is connected to the switching power supply is used as an example. In actual production, application to other scenarios is also allowed, and specifically, determination may be performed according to embodiment, which is not limited in the present invention. It can be understood that an idle case is that the preset value is 0. Similarly, when the preset value is 5 (or another value determined according to a specific implementation scenario), the load between 0 and 5 is a light load. The load greater than or equal to 5 is a heavy load.

For a conventional switching power supply, via a CV or CC control loop, a secondary side bias current of the OC device is fed back to the primary side. For the switching power supply, as the load of the secondary output end decreases, the secondary bias current IOC_LED increases. In a steady state, IOC_C=CTR×IOC_LED, where CTR a current transfer ratio of OC. In this case, no matter how the load changes, the switching power supply is always in a first mode (a burst mode), so that the switching power supply is in the standby state. In this case, values of both IOC_C and IOC_LED are maximum values, and standby loss cannot be further reduced. It should also be noted that in actual application, the burst mode is further divided into a shallow burst mode and a deep burst mode.

Power standby using the burst mode is specifically as follows: As the load decreases, an output voltage (Vout) of the secondary side increases, and the bias current IOC_LED of the secondary side increases. The bias current IOC_C of the primary side increases proportionally, and a voltage received by a COMP pin decreases. When the COMP voltage is lower than BML (a reference voltage low threshold of the burst mode), the primary side enters the burst mode, and the driving pulse is not output from GATE. After energy transfer is stopped, the output voltage (Vout) of the secondary side starts decreasing. As the output voltage (Vout) of the secondary side decreases, the bias current IOC_LED of the secondary side decreases. The bias current IOC_C of the primary side decreases proportionally, and the primary COMP voltage increases. When the COMP voltage is greater than BMH (a reference voltage high threshold of the burst mode), the primary side control chip exits the burst mode, and GATE outputs a periodic driving pulse signal. Energy is recovered, and is transferred from the primary side to the secondary side, and the output voltage (Vout) of the secondary side starts increasing.

Figure 3:
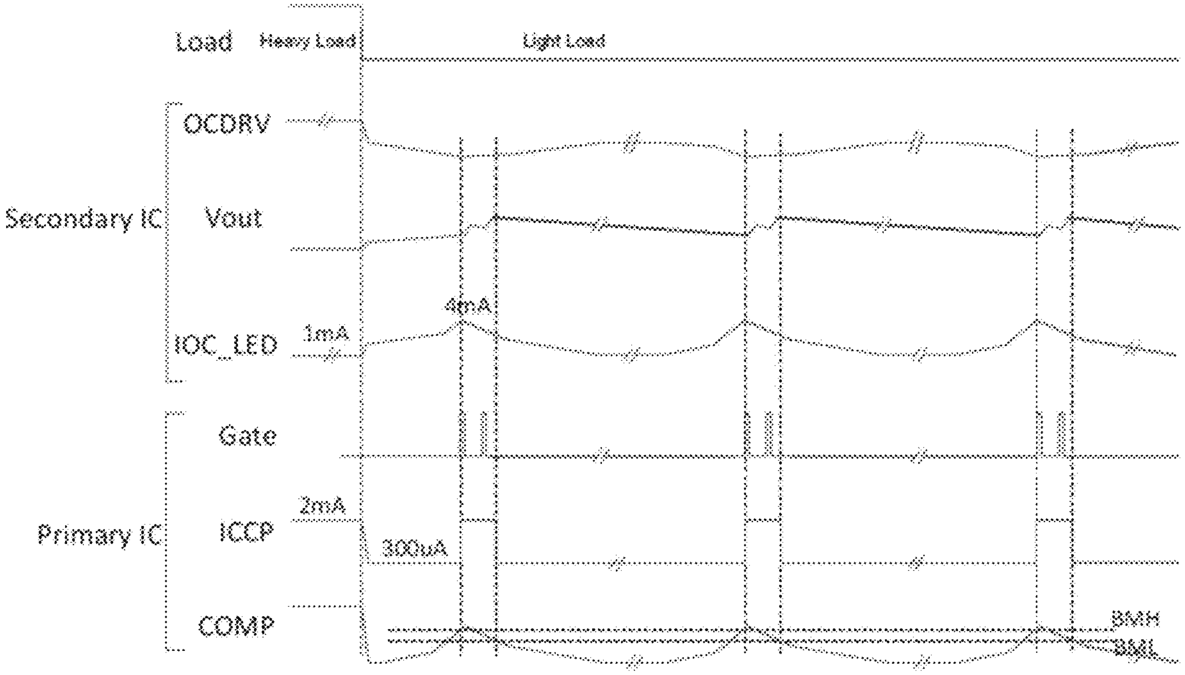
FIG. 3 (Prior Art)
FIG. 3 is an oscillogram of an existing switching power supply in a burst mode.

FIG. 3 is an oscillogram of the existing switching power supply in the burst mode. As shown in FIG. 3, as the load of the output end of the secondary side decreases, the voltage of the COMP pin of the primary control chip decreases. When the COMP voltage is less than BML, a system enters the shallow burst mode, so that a pulse output time ratio thereof is large, and a pulse-free time ratio is small. When the load is detached from the power supply, the system enters the deep burst mode, so that the pulse output time ratio is small, and the pulse-free time ratio is large. In this case, a maximum corresponding bias current is present on each of the primary side and the secondary side of the OC device. When COMP greater than BMH decreases to be between BML and BMH, GATE performs output, and some modules recover, so that ICCP increases (in this case, ICCP is 2 mA). When COMP less than BML increases to be between BML and BMH, GATE does not perform output, and some modules are turned off to decrease ICCP (in this case, ICCP is 300 μA). When COMP is between BML and BMH, whether GATE performs output depends on the previous state of COMP.

When the burst mode is used, OC needs to be provided with the bias current IOC_C at the level of 100 μA on the primary side, and ICC is generally not less than 300 μA. During normal operation, a DEM pin of a control chip detects a resonance waveform (the resonance waveform is generated by a coil of the primary side and a capacitor of a drain of Qp), so that when Qp is driven, the output voltage is turned on and/or detected at a valley of the resonance waveform. After entering the burst mode, GATE does not output any driving pulse. In this case, none of signals detected by the DEM pin is considered, and in this case, even the detection function of the DEM pin is turned off to reduce loss.

Figure 4:
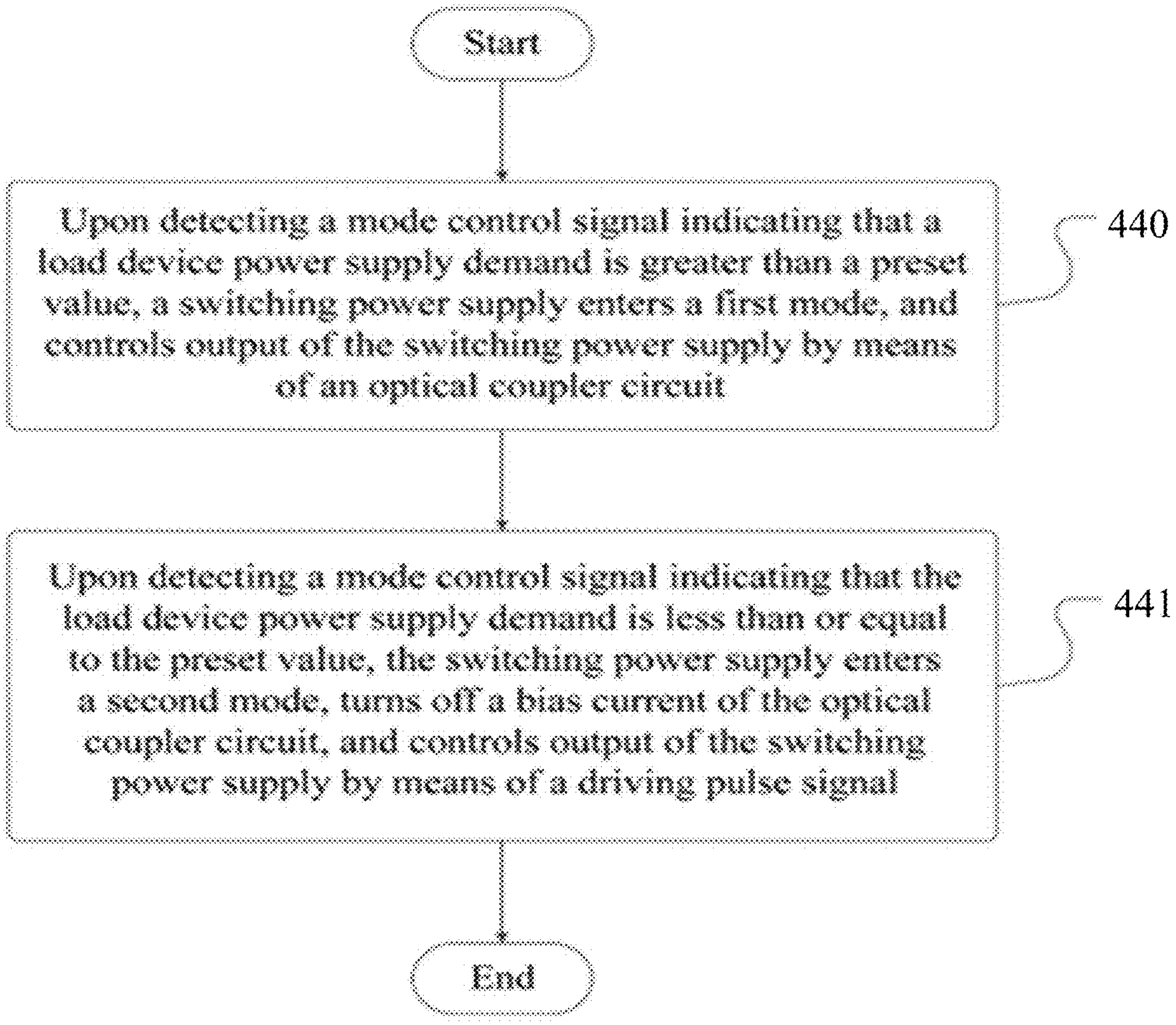
FIG. 4 is a flowchart of a standby method for a switching power supply according to an embodiment of the present invention.

FIG. 4 is a flowchart of a standby method for a switching power supply according to an embodiment of the present invention. As shown in FIG. 4, the method is applied to a switching power supply provided with an optical coupler, and includes: 440: upon detecting a mode control signal indicating that a load device power supply demand is greater than a preset value, entering, by the switching power supply, a first mode, and controlling output of the switching power supply by means of an optical coupler circuit; and 441: upon detecting a mode control signal indicating that the load device power supply demand is less than or equal to the preset value, entering, by the switching power supply, a second mode, turning off a bias current of the optical coupler circuit, and controlling the output of the switching power supply by means of a driving pulse signal.

In this case, it is possible to reduce bias currents of a primary side and a secondary side of the switching power supply, and reduce standby power consumption of the switching power supply.

First, it should be noted that the first mode is a burst mode, and the second mode is a sleep mode. In addition, the mode control signal indicating a relationship between the load device power supply demand and the preset value is C1 and C2. The mode control signal for activating the sleep mode is an arbitrary combination of C1 and C2. For example: the mode control signal indicating that the load device power supply demand is greater than the preset value is set to C1 and C2 that are both high-level signals or low-level signals. Alternatively, four sets of two-bit binary data (00, 01, 10, 11) are used for indication. When data acquired by combining C1 and C2 is 00 or 01, the mode control signal indicates that the load device power supply demand is greater than the preset value. Certainly, it can be understood that alternatively, when data acquired by combining C1 and C2 is 10 or 11, the mode control signal indicates that the load device power supply demand is greater than the preset value. Specific implementations may be determined according to specific implementation scenarios, and are not limited in the present embodiment.

Thus, it can be seen that in the present embodiment, the bias current of the optical coupler circuit is turned off, so that the bias currents of the primary side and the secondary side are both 0, thereby reducing quiescent loss while reducing the bias current, and further reducing standby power consumption.

On the basis of the aforementioned standby method for a switching power supply, implementation of the secondary side entering the second mode is as follows: generating, according to the bias current of the optical coupler circuit, a notification signal indicating that the switching power supply has entered the second mode; and controlling, according to the notification signal maintained for a first preset time length, a secondary side control chip to enter the second mode.

The notification signal generated according to the bias current of the optical coupler circuit and indicating that the switching power supply has entered the second mode is referred to as an Iting signal. It should be noted that the Iting signal is a portion of the bias current of the optical coupler circuit. In addition, the first preset time length that the notification signal is maintained for is denoted as T1, and as a preferred embodiment, T1=240 ms.

Implementation of the primary side entering the second mode is as follows: when the primary side control chip acquires that a level signal of a voltage signal outputted by the optical coupler circuit has been inverted and a retention time length of the inverted level signal has reached a time threshold, controlling the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In order to maintain the switching power supply in the second mode, two embodiments are provided in the present invention, and are specifically as follows: A first embodiment of maintaining the switching power supply in the second mode is as follows: when a primary side control chip acquires an output undervoltage signal indicating that an output voltage is in an undervoltage state, outputting the driving pulse signal at the primary side control chip; and adjusting the output of the switching power supply according to the driving pulse signal, so that the switching power supply is in the second mode.

Further, the primary side control chip acquiring an output undervoltage signal indicating that the output voltage is in an undervoltage state includes: determining whether an output voltage in the secondary side control chip is less than a first preset output voltage; and if so, transmitting the output undervoltage signal to the primary side control chip; or if not, skipping outputting the output undervoltage signal.

In the present embodiment, the first preset output voltage is set to 4V, and the output voltage in the secondary side control chip is denoted as Vout. Detection is performed in the secondary side control chip, and a relationship between Vout and 4V is determined via comparison in a comparator U2, so as to determine whether an output undervoltage signal is present. When Vout is greater than 4V, the output undervoltage signal is not transmitted, and the driving pulse signal is not present at a GATE pin. When Vout is less than 4V, the output undervoltage signal is transmitted, and the driving pulse signal is present at the GATE pin. When the driving pulse signal is output, the output of the switching power supply is controlled by means of a power switch Qp and a transformer T1. The driving pulse signal is denoted as Idrive in the present embodiment.

In addition, after the GATE pin outputs the driving pulse signal, a resonance signal is generated with an internal capacitor in the power switch Qp. In order to avoid self-excitation caused by the resonance signal, when the primary side control chip is within a preset resonance time, detection on the primary side control chip is blocked.

Correspondingly, a first embodiment of the secondary side control chip exiting the second mode specifically includes: after the controlling output of the switching power supply by means of a driving pulse signal, the method further includes: when the secondary side control chip acquires the mode control signal indicating that the load device power supply demand is greater than the preset value, outputting, by means of a transformer, a wake-up signal which has a preset frequency and which indicates exiting the second mode, controlling the secondary side control chip to stop outputting the wake-up signal, and controlling, according to the wake-up signal, the secondary side control chip to exit the second mode.

Correspondingly, a first embodiment of the primary side control chip exiting the second mode specifically includes: after the outputting, by means of a transformer, a wake-up signal which has a preset frequency and which indicates exiting the second mode, the method further includes: when it is determined that the preset frequency of the wake-up signal is less than a frequency threshold, controlling the primary side control chip to exit the second mode.

A second embodiment of maintaining the switching power supply in the second mode is as follows: the turning off a bias current of the optical coupler circuit, and controlling the output of the switching power supply by means of a driving pulse signal includes: when an input voltage of an auxiliary winding of the primary side is adjusted to be within a preset range, outputting the driving pulse signal at the primary side control chip; and adjust the output of the switching power supply according to the driving pulse signal and a relationship between the input voltage and the output voltage, so that the switching power supply is in the second mode.

In this case, the input voltage of the auxiliary winding of the primary side is denoted as VCC, and it is determined, according to whether VCC is within the preset range, whether to maintain the switching power supply in the second mode. A relationship between VCC and 7.6V as well as 8.1V is measured. When VCC is less than 7.6V, the GATE pin outputs the driving pulse signal. When VCC is greater than 8.1V, the driving pulse signal is not present at the GATE pin.

In addition, the adjusting the output of the switching power supply according to a relationship between the input voltage and the output voltage includes: adjusting the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side, and may be represented by the following formula: $Vout=VCC*Ns/Na$, where Na represents the number of turns of a coil of the auxiliary winding, and Ns represents the number of turns of a coil of the secondary side.

Correspondingly, a second embodiment of the primary side control chip exiting the second mode specifically includes: after the controlling output of the switching power supply by means of a driving pulse signal, the method further includes: when the level signal of the voltage signal outputted by the optical coupler circuit and acquired by the primary side control chip is inverted, and a retention time length of the inverted level signal reaches a second preset time length, controlling the secondary side control chip to stop outputting the wake-up signal, and controlling, according to the wake-up signal, the primary side control chip to exit the second mode.

The second preset time length is denoted as T2.

Correspondingly, a second embodiment of the secondary side control chip exiting the second mode specifically includes: controlling, according to the notification signal maintained for a third preset time length, the secondary side control chip to exit the second mode.

The third preset time length is denoted as T3.

According to the foregoing, it should also be noted that the switching power supply provided in the embodiments of the present invention generally has three states during operation. Specifically: A first state, in a normal operation mode, that is, on the basis of the foregoing embodiment about charging a mobile phone, is a state of charging a mobile phone normally. A second state may be understood as that when a mobile phone is charged via the switching power supply, the fully charged mobile phone is not disconnected from the switching power supply. A third state may be understood as that when a mobile phone is charged via the switching power supply, the fully charged mobile phone is disconnected from the switching power supply. When the relationship between the switching power supply and the load is in the second state, power consumption of the switching power supply is reduced by using the first mode, but in this case, two methods, i.e., a magnetic coupling method and an optical coupling method are used. When the relationship between the switching power supply and the load is in the third state, power consumption of the switching power supply is reduced by using the second mode, but in this case, only the magnetic coupling method is used.

Provided in the present invention is a standby method for a switching power supply. The method is applied to a switching power supply provided with an optical coupler circuit, and includes: upon detecting a mode control signal indicating that a load device power supply demand is greater than a preset value, entering, by the switching power supply, a first mode, and controlling output of the switching power supply by means of an optical coupler circuit; and upon detecting a mode control signal indicating that the load device power supply demand is less than or equal to the preset value, entering, by the switching power supply, a second mode, turning off a bias current of the optical coupler circuit, and controlling the output of the switching power supply by means of a driving pulse signal, so as to reduce bias currents of a primary side and a secondary side of the switching power supply, and reduce standby power consumption of the switching power supply. In this case, the bias current of the optical coupler circuit is turned off, so that the bias currents of the primary side and the secondary side are both 0, thereby reducing the bias current, reducing quiescent loss, and further reducing standby power consumption.

It can be understood that the standby method for a switching power supply is applicable to a power supply system using OC in a CV or CC control loop, including, but not limited to, topologies such as Flyback, LLC, etc., wherein the switching power supply may be an AC/DC SSR power supply. In a switching power supply provided in the present embodiment, an optical coupler circuit is coupled between a primary side and a secondary side. The switching power supply further includes: a mode signal generating circuit, configured to measure a load device power supply demand of the switching power supply, and generate a second mode control signal when the load device power supply demand is less than or equal to a preset value; an optical coupler control circuit, configured to control, according to the second mode control signal, a bias current of the optical coupler circuit to be turned off; and a switching power supply output control circuit, configured to generate a first mode control signal when the load device power supply demand is greater than the preset value, control, according to the first mode control signal, the switching power supply to enter a first mode, control output of the switching power supply by means of the optical coupler circuit, control, according to the second mode control signal, the switching power supply to enter a second mode, and control the output of the switching power supply by means of a driving pulse signal, so as to reduce bias currents of the primary side and the secondary side of the switching power supply, and reduce standby power consumption of the switching power supply. When the switching power supply enters the first mode, the output of the switching power supply is controlled to be stable by adjusting the bias current of the optical coupler circuit.

In some embodiments, the switching power supply output control circuit includes: a notification signal control circuit, configured to generate a notification signal upon receiving the second mode control signal, and configured to notify the primary side control chip to enter or exit the second mode, so that the switching power supply controls the output of the switching power supply by means of the driving pulse signal, so as to reduce the bias currents of the primary side and the secondary side of the switching power supply, and reduce the standby power consumption of the switching power supply; and a primary mode control circuit, configured to receive the notification signal, and control, on the basis of the notification signal, the primary side control chip to change an operation mode, the operation mode including the first mode or the second mode, wherein when the load device power supply demand is greater than the preset value, the switching power supply enters the first mode, and the output of the switching power supply is controlled by means of the optical coupler circuit.

In some embodiments, the notification signal control circuit includes: a first second-mode-entering control circuit, configured to generate, according to the bias current of the optical coupler circuit, the notification signal indicating that the switching power supply has entered the second mode, and control, according to the notification signal maintained for a first preset time length, a secondary side control chip to enter the second mode.

In some embodiments, the notification signal control circuit further includes: a second second-mode-entering control circuit, configured to control, when the primary side control chip acquires that a level signal of a voltage signal outputted by the optical coupler circuit has been inverted and a retention time length of the inverted level signal has reached a time threshold, the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In some embodiments, the primary mode control circuit includes: a first second-mode-maintaining control circuit, configured to output, at the primary side control chip, the driving pulse signal when a primary side control chip acquires an output undervoltage signal indicating that an output voltage is in an undervoltage state, and adjust the output of the switching power supply according to the driving pulse signal, so that the switching power supply is in the second mode.

In some embodiments, the primary mode control circuit further includes: a first determination circuit, configured to determine whether the output voltage in the secondary side control chip is less than a first preset output voltage, and when the output voltage is less than the first preset output voltage, transmit the output undervoltage signal to the primary side control chip.

In some embodiments, the primary mode control circuit further includes: a first blocking circuit, configured to block, when the primary side control chip is within a preset resonance time, detection on the primary side control chip.

In some embodiments, the notification signal control circuit further includes: a first secondary second-mode-exiting control circuit, configured to output, by means of a transformer when the secondary side control chip acquires the mode control signal indicating that the load device power supply demand is greater than the preset value, the wake-up signal which has a preset frequency and which indicates exiting the second mode, control the secondary side control chip to stop outputting the wake-up signal, and control, according to the wake-up signal, the secondary side control chip to exit the second mode.

In some embodiments, the notification signal control circuit further includes: a first primary second-mode-exiting control circuit, configured to control, when it is determined that the preset frequency of the wake-up signal is less than a frequency threshold, the primary side control chip to exit the second mode.

In some embodiments, the primary mode control circuit further includes: a second second-mode-maintaining control circuit, configured to output, at the primary side control chip, the driving pulse signal when an input voltage of an auxiliary winding of the primary side is adjusted to be within a preset range, and adjust the output of the switching power supply according to the driving pulse signal and a relationship between the input voltage and the output voltage, so that the switching power supply is in the second mode.

In some embodiments, the primary mode control circuit further includes: a first adjusting circuit, configured to adjust the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side.

In some embodiments, the notification signal control circuit further includes: a second primary second-mode-exiting control circuit, configured to control, when the level signal of the voltage signal outputted by the optical coupler circuit and acquired by the primary side control chip is inverted, and a retention time length of the inverted level signal reaches a second preset time length, the secondary side control chip to stop outputting the wake-up signal, and control, according to the wake-up signal, the primary secondary side control chip to exit the second mode.

In some embodiments, the notification signal control circuit further includes: a second secondary second-mode-exiting control circuit, configured to control, according to the notification signal maintained for a third preset time length, the secondary side control chip to exit the second mode.

Figure 5:
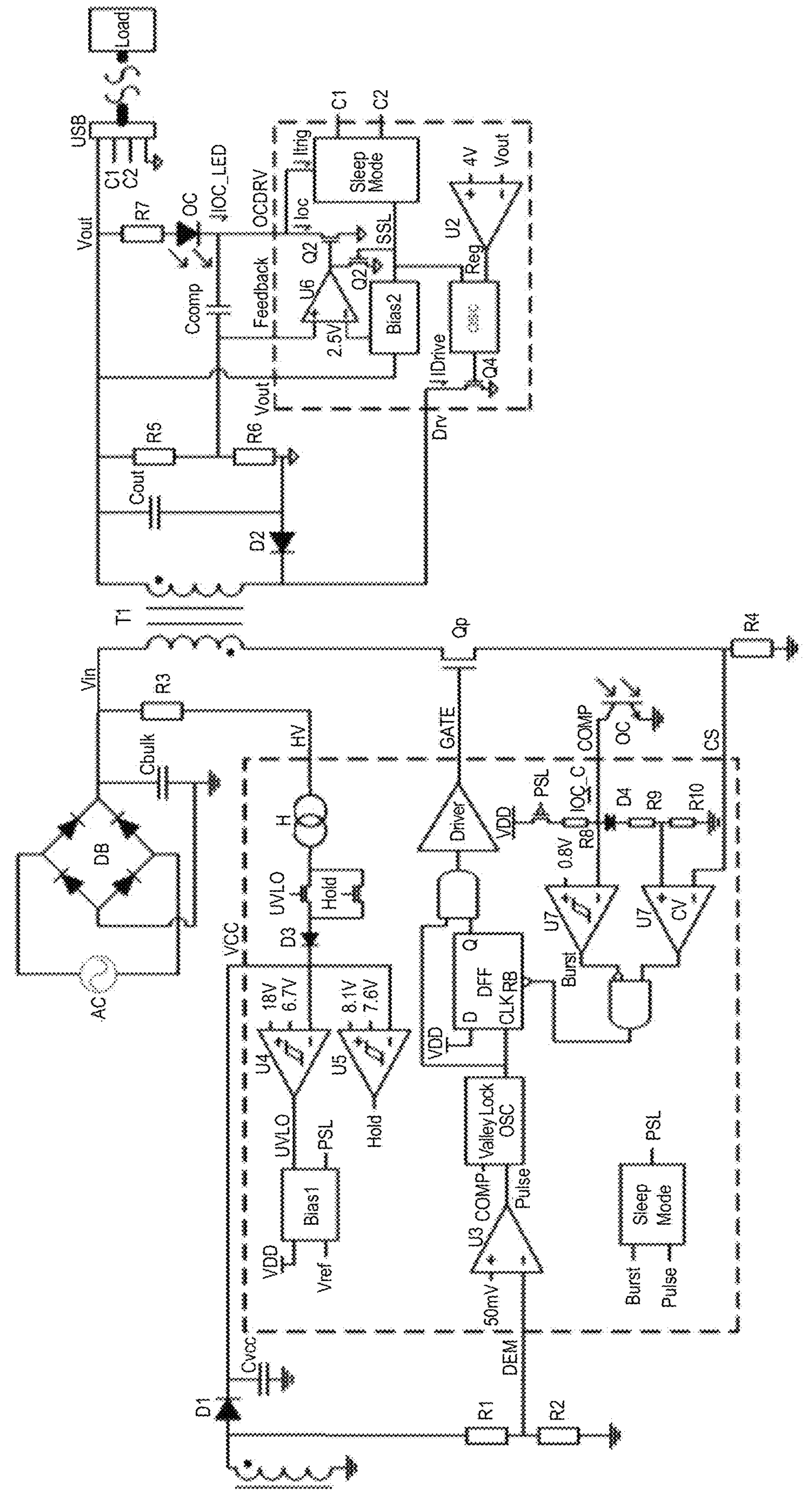
FIG. 5 is a structural diagram of a first switching power supply according to an embodiment of the present invention.

FIG. 5 is a structural diagram of a first switching power supply according to an embodiment of the present invention. As shown in FIG. 5, in some embodiments, the mode signal generating circuit includes at least a mode control signal interface (C1, C2) a second mode control unit (Sleep Mode). The mode control signal interface is configured to correspondingly transmit, to the second mode control unit, the mode control signal indicating that the load device power supply demand is greater than the preset value. In addition, the optical coupler control circuit includes at least a secondary first switching transistor Q2 and a secondary second switching transistor Q3, a first end of the secondary first switching transistor being connected to the optical coupler circuit, a second end of the secondary first switching transistor being grounded, a control end of the secondary first switching transistor being connected to a first end of the secondary second switching transistor, a second end of the secondary second switching transistor being grounded, and a control end of the secondary second switching transistor being connected to the second mode unit.

Therefore, the following circuit structure is further included in the secondary side control chip, and specifically includes: a second mode control unit Sleep Mode provided in the secondary side control chip, wherein the second mode control unit is provided with the mode control signal interface (C1, C2); and a secondary amplifier U2, configured to determine a relationship between Vout and 4V via comparison to determine whether an output undervoltage signal is present, wherein when Vout is greater than 4V, the output undervoltage signal is not transmitted, and the driving pulse signal is not present at a GATE pin, and when Vout is less than 4V, the output undervoltage signal is transmitted, and the driving pulse signal is present at the GATE pin, the output of the switching power supply being controlled by means of a power switch Qp and a transformer T1 when the driving pulse signal is output.

An output end of the secondary amplifier U2 is connected to a first end of an oscillator OSC. A second end of the oscillator OSC is connected to a control end of a secondary driving switching transistor Q4. A first end of the secondary driving switching transistor Q4 is connected to the secondary winding of the transformer T1. A second end of the secondary driving switching transistor Q4 is grounded.

A direct current biasing circuit Bias2 connected to both OSC and Sleep Mode is further provided. The control end of the secondary second switching transistor Q3 is connected to the direct current biasing circuit Bias2. The first end of the secondary second switching transistor Q3 is connected to an output end of a comparator U6. The second end of the secondary second switching transistor Q3 is grounded. The control end of the secondary first switching transistor Q2 is connected to the output end of the comparator U6. The first end of the secondary first switching transistor Q2 is connected to an optical coupler switching transistor. The second end of the secondary first switching transistor Q2 is grounded. A non-inverting input end of the comparator U6 is connected to Ccomp. An inverting input end (inputting a voltage of 2.5V) of the comparator U6 is connected to the direct current biasing circuit Bias2. The direct current biasing circuit Bias2 is further connected to R5.

Correspondingly, the following circuit structure is further included in the primary side control chip. Specifically: A direct current biasing circuit Bias1 provided in the primary side control chip has four input/output ports respectively denoted as VDD, UVLO, PSL, and Vref. The UVLO port is connected to an output end of a comparator U4. An output end of a comparator U5 receives a Hold signal. The comparator U4 restricts a voltage value passing therethrough to be between 18V and 6.7V. The comparator U5 restricts a voltage value passing therethrough to be between 18V and 7.6V. A diode D3 and a parallel-connected switching transistor are respectively configured to receive signals corresponding to UVLO and Hold. A constant current source H is connected to an output pin HV of the primary side control chip. First, two input ends of a primary first amplifier U3 are described. A voltage of 50 mV should be input to a non-inverting input end, and an inverting input end should be connected to an output pin DEM of the primary side control chip. An output end of the primary first amplifier U3 is connected to a Valley Lock OSC module, and a DFF module is further connected in sequence. The Valley Lock OSC module is provided with a plurality of pins, and the pins are respectively: COMP and Pulse. The Pulse pin is connected to the output end of the primary first amplifier U3. The DFF module is also provided with a plurality of pins, and the pins are respectively: D (input of an external power supply, and the value being VDD), CLK, RB, and Q. The DFF module is connected to the Valley Lock OSC module by means of the CLK pin. The Q pin is connected to an AND gate. An output end of the AND gate is connected to a driver amplifier Driver. The AND gate has two input ends. One of the two input ends is connected to an output end of the Valley Lock OSC module, and the other input end is connected to the Q pin of the DFF module. An output end of the driver amplifier Driver is used as a pin GATE, and outputs a driving pulse signal. The driving pulse signal is used to drive Qp. The RB pin is further connected to a NAND gate. A first output end of the NAND gate is connected to an output end of a comparator U7. A second output end of the NAND gate is connected to an output end of a comparator U8. A non-inverting input end of the comparator U7 has a voltage of 0.8V. An inverting input end of the comparator U7 is connected to the COMP pin. A non-inverting input end of the comparator U8 is connected to a common end of R9 and R10. The other end of R10 is grounded. The other end of R9 is connected to a cathode of a diode D4. An anode of the diode D4 is connected to one end of R8, and the other end of R8 is connected to a second end of a switching transistor PSL. A first end of the switching transistor PSL is connected to an external power supply VDD. The inverting input end of the comparator U7 is connected to a CS pin. The CS pin is connected to an external resistor R4. The other end of R4 is grounded. In addition, in the primary side control chip, signals for controlling the second mode control unit Sleep Mode are respectively Brust, Pulse, and PSL. Brust is a signal from the output end of the comparator U7. PSL is a signal from a control end of the switching transistor PSL. Pulse is a signal from the output end of the primary first amplifier U3.

It should be noted that, in the structure, attachment of a load to the power supply is detected via signals C1 and C2 on a USB interface attached to the load (Load). A specific implementation is as follows: when the signals C1 and C2 are both of high levels (i.e., a mode control signal is 11), it is indicated that the load is detached from the switching power supply, and in this case, a sleep mode (SleepMode, SM) is activated. A module corresponding to the sleep mode, an OSC module, an amplifier, etc., are provided for reconnection of a peripheral circuit of OCDRV. It should be emphasized that the secondary amplifier U2 is adapted to detect whether the amplifier outputs a voltage that is undervoltage. A set undervoltage threshold is 4V. Certainly, the undervoltage threshold includes, but is not limited to, 4V, may be other values, and may be determined according to a specific implementation scenario. For the module corresponding to the sleep mode, it should also be noted that the module is further configured to be driven by an Itring signal. After the bias current of the secondary side is set to 0, the corresponding secondary first switching transistor Q2 is also in an off state. The internal circuit of the primary side control chip also needs to be reconnected. Certainly, it can be understood that a plurality of connection methods are applicable to the internal circuit of the control chip. FIG. 5 shows only a first one of a plurality of embodiments, and implementation thereof may be determined according to a specific implementation scenario.

When it is determined that the load is disconnected from the switching power supply, the sleep mode is activated as follows: setting an OC bias current to 0 (IOC_LED=0), where secondary side current loss may decrease by one order of magnitude to the level of 100 μA; and controlling Vout via magnetic coupling: monitoring Vout, and if an undervoltage occurs, outputting an excitation pulse signal (IDrive), and transmitting the same to the primary side via the transformer, so that GATE outputs a driving pulse signal to transfer energy to the secondary side and maintain the output voltage stable. The undervoltage signal is independent of any resonance waveform, and only indicates that Vout is undervoltage.

The OC bias current of the secondary side is set to 0 (IOC_LED=0), and due to characteristics of OC, an OC bias current (IOC_C) of the primary side synchronously decreases to 0. The CV or CC control loop employing OC feedback stops operating. Both primary current loss and secondary current loss may decrease by one order of magnitude, and system standby loss may decrease to be less than or equal to 5 mW.

The output voltage (Vout) may instead be controlled by the CV control loop employing magnetic coupling: after the secondary side enters the sleep mode, measuring the output voltage (Vout), and turning off the OC bias current (IOC_LED); and if Vout is undervoltage, transmitting an undervoltage signal IDrive, and transmitting the same to the DEM pin of the primary side via the transformer; or if Vout is not undervoltage, skipping transmitting the undervoltage signal.

After the primary side enters the sleep mode, a DEM pin signal is monitored, and ICC is decreased. If an undervoltage letter transmitted by the secondary side is detected at the DEM pin, GATE outputs a driving pulse signal to maintain the output voltage of the secondary side.

The output voltage Vout may also be indirectly controlled by controlling VCC of the primary side: after the primary side enters the sleep mode, monitoring a VCC voltage, and decreasing ICC; if it is detected that VCC is undervoltage, outputting, by GATE, a driving pulse signal to maintain the VCC voltage within a certain range; and maintaining a turn ratio relationship (Na/Ns) between the output voltage Vout and the VCC voltage.

First, it should be noted that if the load is attached to the power supply in this case, standby of the power supply is still maintained in the burst mode. When the load is detached from the power supply, standby of the power supply is maintained in the sleep mode, and when the sleep mode is activated, driving is performed by using a high level of an SSL signal indicating that the sleep mode has been activated.

Figure 6:
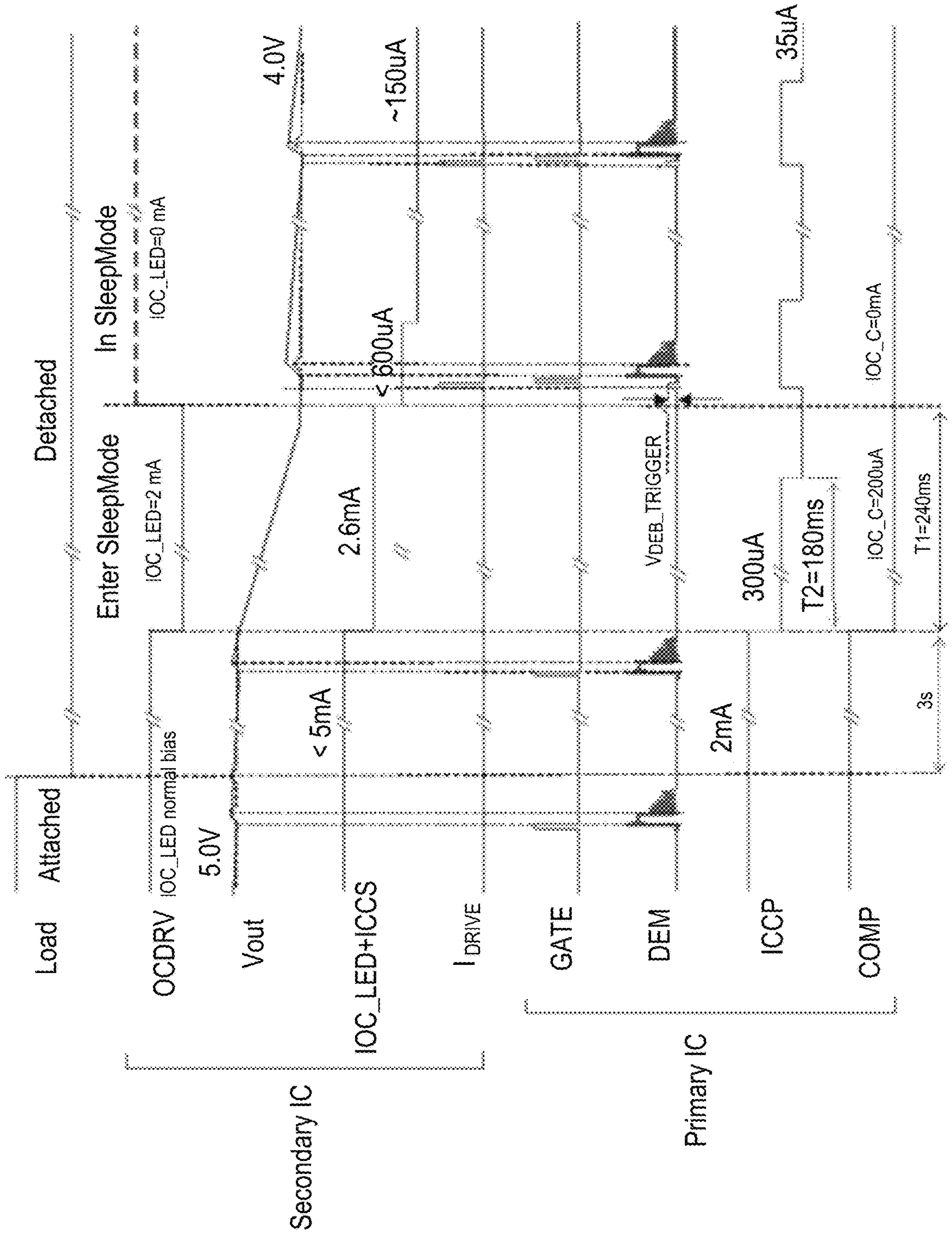
FIG. 6 is an oscillogram of entering a sleep mode corresponding to a first switching power supply according to an embodiment of the present invention.

FIG. 6 is an oscillogram of entering the sleep mode corresponding to the first switching power supply according to an embodiment of the present invention. As shown in FIG. 6, when the secondary side enters the sleep mode (SSL=H), IOC_LED=0 is set (in this case, the signal may also be represented by an Iopto signal). In addition, an Itrig signal is set to 2 mA, and is maintained for a time of T1 (240 ms). After the time of T1, the Itrig signal is 0 A. In this case, a quiescent current is as small as 150 μA. When the Itrig signal is 2 mA, COMP of the primary side is less than BML, and the primary side enters the burst mode. In this case, GATE does not output the driving pulse signal. After the burst mode of the primary side lasts a time of T2 (180 ms, T2<T1), the primary side enters the sleep mode. After the time of T1, the bias current (IOC_C) of the primary side synchronously decreases to 0. In this case, the quiescent current is as small as 30 μA.

In the sleep mode, standby power consumption of the power supply may decrease to 5 mW or less, and the secondary side directly monitors the output voltage Vout. if Vout<4V, an undervoltage signal IDrive (a 30-mA current pulse having a width of 1 μs and a period of 300 μs) is transmitted, and is transmitted to the DEM pin of the primary side via the transformer. If Vout≥4V, the undervoltage signal is not transmitted.

After the primary side enters the burst mode or the sleep mode, detection of a signal of the DEM pin is performed. If an undervoltage signal transmitted by the secondary side is detected at the DEM pin, GATE outputs a driving pulse signal to maintain the output voltage of the secondary side. If the undervoltage signal is not detected at the DEM pin, GATE does not output the driving pulse signal.

The primary side in the process of going to sleep is in the burst mode in the time period T2. In the process, a constant voltage control loop employing OC feedback stops operating. In this case, GATE does not output the driving pulse signal. After energy transfer is stopped, the output voltage Vout decreases continuously, and may be less a minimum operating voltage of the secondary side, so that the secondary chip is undervoltage. If undervoltage occurs, the secondary side stops operating, and the power supply system cannot operate normally. Therefore, in the burst mode, the primary side also needs to detect an undervoltage signal of the DEM pin and respond.

After the primary side outputs the driving pulse signal, a resonance signal is present at the DEM pin, and the primary side needs to block, in a resonance time period, detection on the DEM pin, so as to avoid self-excitation.

Figure 7:
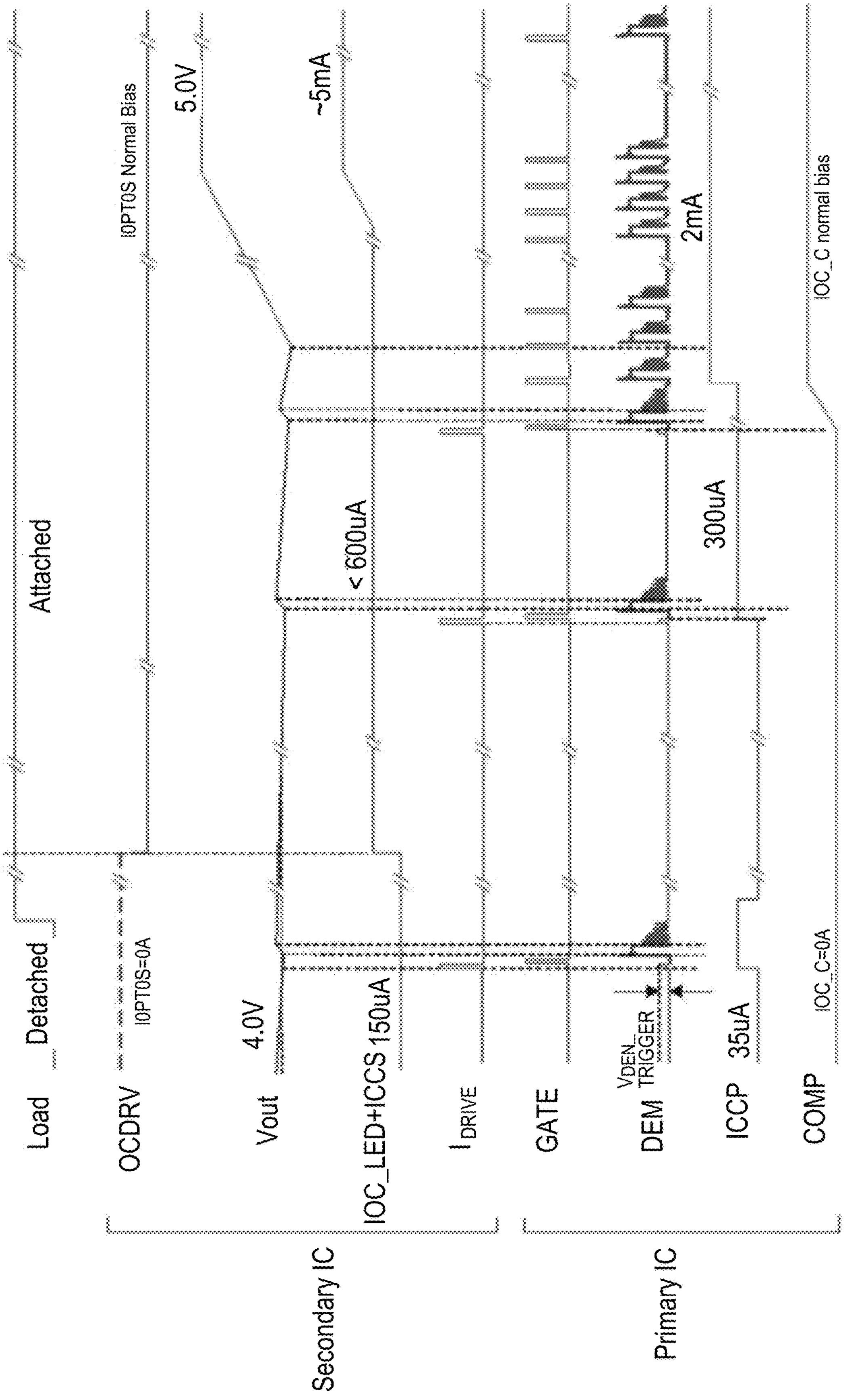
FIG. 7 is an oscillogram of exiting a sleep mode corresponding to a first switching power supply according to an embodiment of the present invention.

FIG. 7 is an oscillogram of exiting the sleep mode corresponding to the first switching power supply according to an embodiment of the present invention. As shown in FIG. 7, if the load is attached again, the secondary side exits the sleep mode, and a wake-up signal IDrive (a 30-mA current pulse having a width of 1 μs and a period of 200 μs) is transmitted, and is transmitted to the DEM pin via the transformer. In this case, the quiescent current returns to normal. Specifically: in the sleep mode, if the primary side detects that a pulse period of the DEM pin signal is less than 250 μs, the primary side exits the sleep mode. Primary COMP returns to a normal bias, and the voltage is determined by the loop. In this case, the quiescent current returns to normal.

Figure 8:
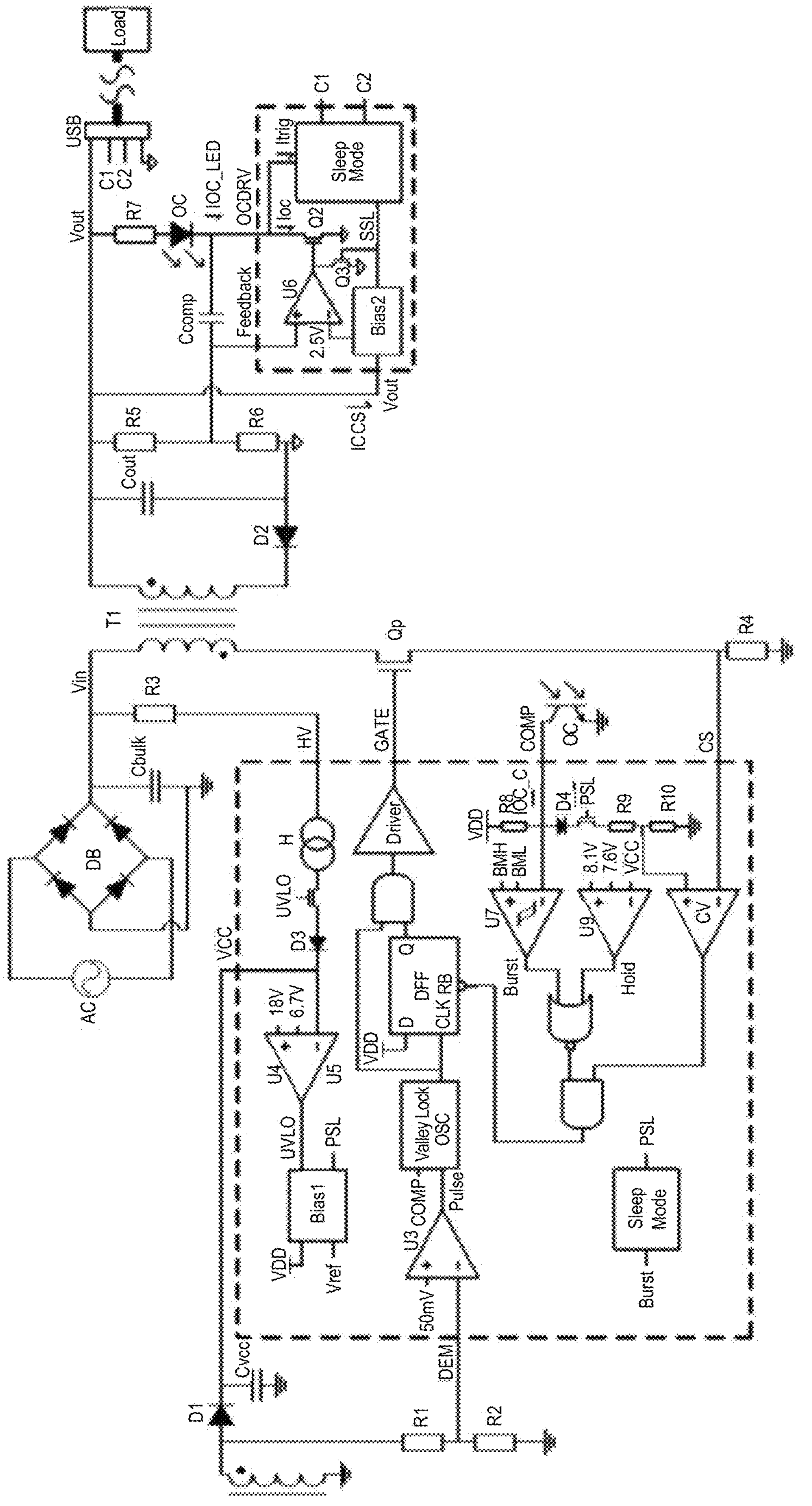
FIG. 8 is a structural diagram of a second switching power supply according to an embodiment of the present invention.

On the basis of the foregoing embodiments, the present invention further provides the following embodiments. FIG. 8 is a structural diagram of a second switching power supply according to an embodiment of the present invention. As shown in FIG. 8, compared with the structure shown in FIG. 5, the following circuit structure is further included in the secondary side control chip. Specifically: a second mode control unit Sleep Mode provided in the secondary side control chip, wherein the second mode control unit is provided with the mode control signal interface (C1, C2).

The output end of the second mode control unit Sleep Mode outputs an SSL signal, and is connected to a first end of the direct current biasing circuit Bias2. The control end of the secondary second switching transistor Q3 is connected to the direct current biasing circuit Bias2. The first end of the secondary second switching transistor Q3 is connected to an output end of a comparator U6. The second end of the secondary second switching transistor Q3 is grounded. The control end of the secondary first switching transistor Q2 is connected to the output end of the comparator U6. The first end of the secondary first switching transistor Q2 is connected to an optical coupler switching transistor. The second end of the secondary first switching transistor Q2 is grounded. A non-inverting input end of the comparator U6 is connected to Ccomp. An inverting input end (inputting a voltage of 2.5V) of the comparator U6 is connected to the direct current biasing circuit Bias2. The direct current biasing circuit Bias2 is further connected to R5.

Correspondingly, the following circuit structure is further included in the primary side control chip. Specifically: A direct current biasing circuit Bias provided in the primary side control chip has four input/output ports respectively denoted as VDD, UVLO, PSL, and Vref. The UVLO port is connected to an output end of a comparator U4. The comparator U4 restricts a voltage value passing therethrough to be between 18V and 6.7V, and is connected to an output pin HV of the primary side control chip by means of a diode D3, a switching transistor UVLO, and a constant current source H. First, two input ends of a primary first amplifier U3 are described. A voltage of 50 mV should be input to a non-inverting input end, and an inverting input end should be connected to an output pin DEM of the primary side control chip. An output end of the primary first amplifier U3 is connected to a Valley Lock OSC module, and a DFF module is further connected in sequence. The Valley Lock OSC module is provided with a plurality of pins, and the pins are respectively: COMP and Pulse. The Pulse pin is connected to the output end of the primary first amplifier U3. The DFF module is also provided with a plurality of pins, and the pins are respectively: D (input of an external power supply, and the value being VDD), CLK, RB, and Q. The DFF module is connected to the Valley Lock OSC module by means of the CLK pin. The Q pin is connected to an AND gate. An output end of the AND gate is connected to a driver amplifier Driver. The AND gate has two input ends. One of the two input ends is connected to an output end of the Valley Lock OSC module, and the other input end is connected to the Q pin of the DFF module. An output end of the driver amplifier Driver is used as a pin GATE, and outputs a driving pulse signal. The driving pulse signal is used to drive Qp. The RB pin of the DFF module is further connected to an AND gate. A first output end of the AND gate is connected to an input end of a NOR gate. A second output end of the AND gate is connected to an output end of a comparator U8. A first output end of the NOR gate is connected to an output end of the comparator U7. A second output end of the NOR gate is connected to an output end of a comparator U9. The comparator U9 is provided with three input ends, and voltage values of the three input ends are respectively 8.1V, 7.6V, and VCC. The comparator U7 is provided with three input ends, voltage values of two of the three input ends being respectively BMH and BML, and the other input end being connected to the COMP pin. A non-inverting input end of the comparator U8 is connected to a common end of R9 and R10. The other end of R10 is grounded. The other end of R9 is connected to a second end of a switching transistor PSL. A first end of the switching transistor PSL is connected to a cathode of a diode D4. An anode of the diode D4 is connected to one end of R8, and the other end of R8 is connected to an external power supply VDD. The inverting input end of the comparator U8 is connected to a CS pin. The CS pin is connected to an external resistor R4. The other end of R4 is grounded. In addition, in the primary side control chip, signals for controlling the second mode unit Sleep Mode are respectively Brust and PSL. Brust is a signal from the output end of the comparator U7. PSL is a signal from a control end of the switching transistor PSL.

Figure 9:
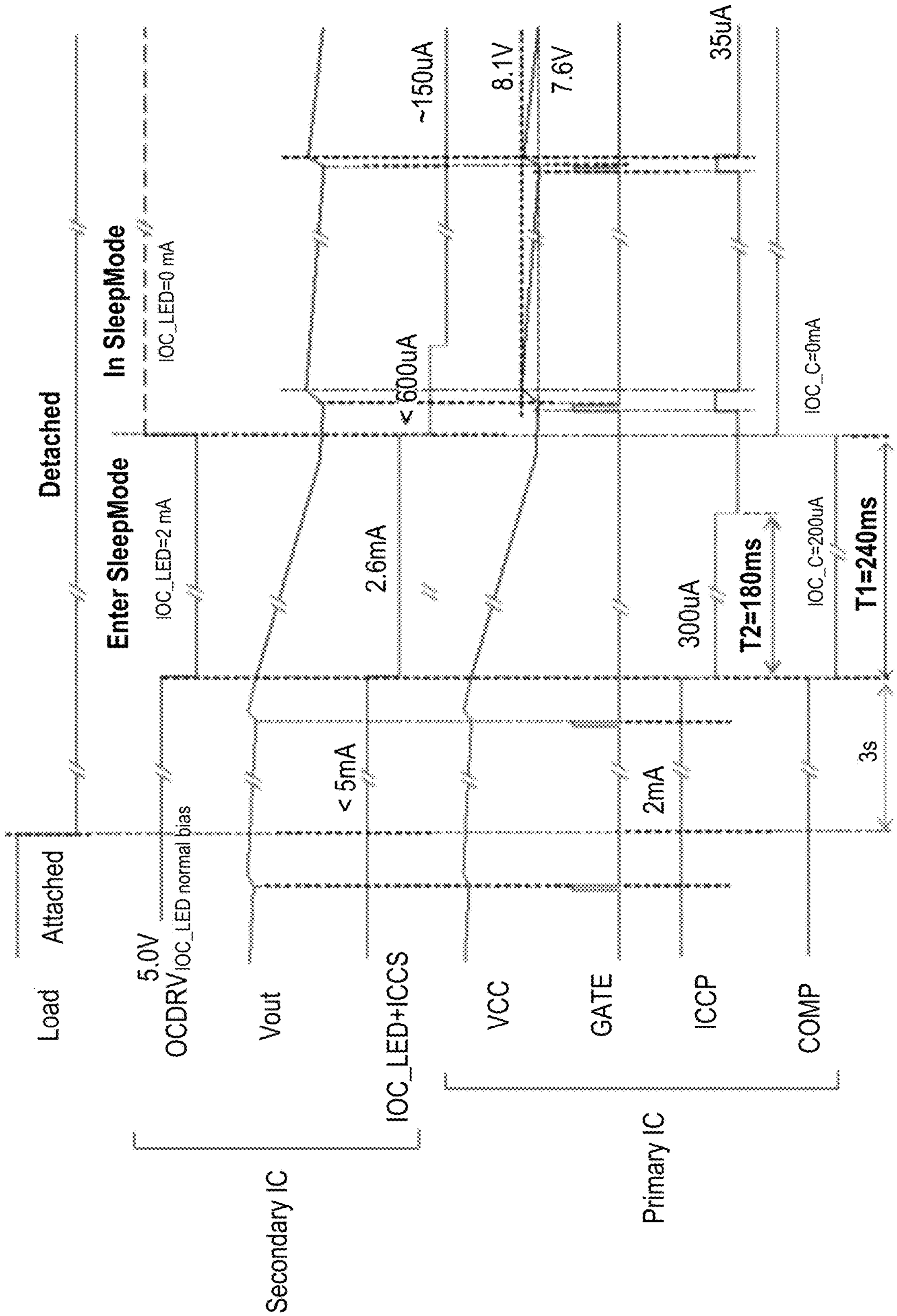
FIG. 9 is an oscillogram of entering a sleep mode corresponding to a second switching power supply according to an embodiment of the present invention.

First, it should be noted that if the load is attached to the power supply in this case, standby of the power supply is still maintained in the burst mode. Only when the load is detached from the power supply, standby of the power supply is maintained in the sleep mode, and when the sleep mode is activated, driving is performed by using a high level of an SSL signal indicating that the sleep mode has been activated. FIG. 9 is an oscillogram of entering a sleep mode corresponding to a second switching power supply according to an embodiment of the present invention. As shown in FIG. 9, the secondary side enters the sleep mode (SSL=H). In this case, the bias current of the secondary side is OA, and Itrig is 2 mA, and lasts for a time of T1 (240 ms). Itrig is OA after the time of T1. In this case, the quiescent current is as small as 150 μA. When the Itrig signal is 2 mA, COMP of the primary side is less than BML, and the primary side enters the burst mode. GATE does not output the driving pulse signal. After the burst mode of the primary side lasts a time of T2 (180 ms, T2<T1), the primary side enters the sleep mode. After the time of T1, COMP of the primary side increases to VDD, but the bias current IOC_C is 0. In this case, the quiescent current is as small as 30 μA. In the sleep mode, standby power consumption of the power supply may decrease to 5 mW or less, and the primary side indirectly controls the output voltage by adjusting VCC. If VCC<7.6V, GATE outputs a periodic driving pulse signal, and the VCC voltage increases. If VCC>8.1V, GATE stops outputting the driving pulse signal, and the VCC voltage decreases. In this case, the output voltage Vout s approximately equal to VCC*Ns/Na.

Figure 10:
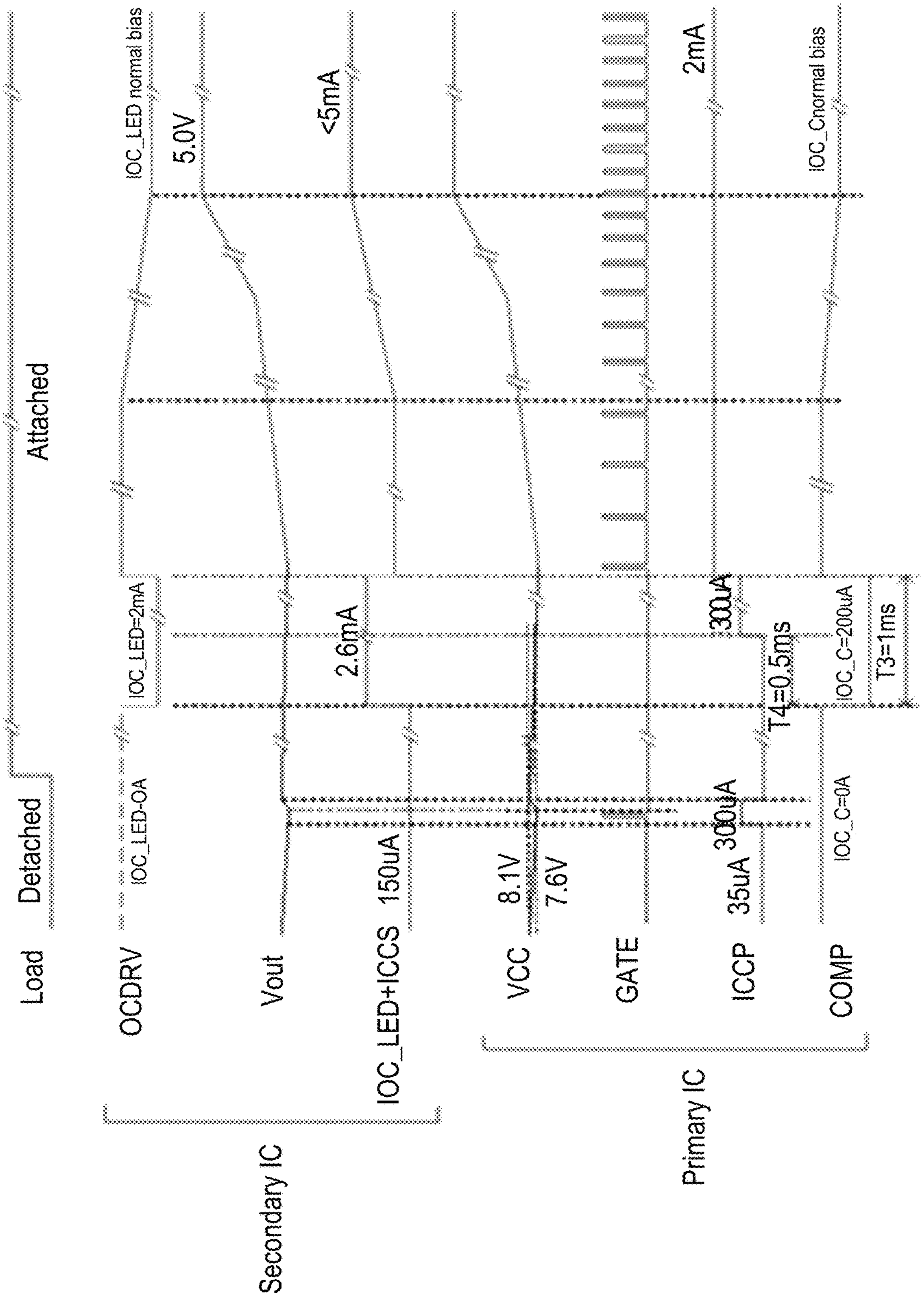
FIG. 10 is an oscillogram of exiting a sleep mode corresponding to a second switching power supply according to an embodiment of the present invention.

FIG. 10 is an oscillogram of exiting the sleep mode corresponding to the second switching power supply according to an embodiment of the present invention. As shown in FIG. 10, if the load is attached again, the secondary side exits the sleep mode, and the Itrig signal is set to 2 mA, and is maintained for a time of T3 (1 ms). After the time of T3, the Itrig signal is 0 μA. In this case, the quiescent current returns to normal. In the sleep mode, a primary chip detects a falling edge of COMP, and after the low level of COMP lasts a time of T4 (0.5 ms, T4<T3), the primary side exits the sleep mode: after the time of T3, primary COMP is determined by the loop. In this case, the quiescent current returns to normal.

In addition, also provided in the present invention are respectively a secondary control circuit of a switching power supply and a primary control circuit of a switching power supply. Specifically:

A secondary control circuit of a switching power supply, an optical coupler circuit being coupled between a primary side and a secondary side of the switching power supply, the secondary control circuit including: a mode signal generating circuit, configured to measure a load device power supply demand of the switching power supply, and generate a second mode control signal when the load device power supply demand is less than or equal to a preset value; an optical coupler control circuit, configured to control, according to the second mode control signal, a bias current of the optical coupler circuit to be turned off; and a notification signal control circuit, configured to generate a notification signal upon receiving the second mode control signal, and configured to notify a primary side control chip to enter or exit a second mode, so that the switching power supply controls output of the switching power supply by means of a driving pulse signal, so as to reduce bias currents of the primary side and the secondary side of the switching power supply, and reduce standby power consumption of the switching power supply.

In some embodiments, the notification signal control circuit includes: a third second-mode-entering control circuit, configured to generate, according to the bias current of the optical coupler circuit, the notification signal indicating that the switching power supply has entered the second mode, and control, according to the notification signal maintained for a first preset time length, a secondary side control chip to enter the second mode.

In some embodiments, the notification signal control circuit further includes: a fourth second-mode-entering control circuit, configured to control, when a primary side control chip acquires that a level signal of a voltage signal outputted by the optical coupler circuit has been inverted and a retention time length of the inverted level signal has reached a time threshold, the primary side control chip to enter the second mode, wherein the time threshold is greater than a maximum value of a duration of the level signal in the first mode, and the secondary side control chip controls a duration of the mode control signal indicating that the load device power supply demand is less than or equal to the preset value to be greater than the time threshold.

In some embodiments, the notification signal control circuit further includes: a third secondary second-mode-exiting control circuit, configured to output, by means of a transformer when the secondary side control chip acquires the mode control signal indicating that the load device power supply demand is greater than the preset value, the wake-up signal which has a preset frequency and which indicates exiting the second mode, control the secondary side control chip to stop outputting the wake-up signal, and control, according to the wake-up signal, the secondary side control chip to exit the second mode.

In some embodiments, the notification signal control circuit further includes: a third primary second-mode-exiting control circuit, configured to control, when it is determined that the preset frequency of the wake-up signal is less than a frequency threshold, the primary side control chip to exit the second mode.

In some embodiments, the notification signal control circuit further includes: a fourth primary second-mode-exiting control circuit, configured to control, when the level signal of the voltage signal outputted by the optical coupler circuit and acquired by the primary side control chip is inverted, and a retention time length of the inverted level signal reaches a second preset time length, the secondary side control chip to stop outputting the wake-up signal, and control, according to the wake-up signal, the primary secondary side control chip to exit the second mode.

In some embodiments, the notification signal control circuit further includes: a fourth secondary second-mode-exiting control circuit, configured to control, according to the notification signal maintained for a third preset time length, the secondary side control chip to exit the second mode.

A primary control circuit of a switching power supply, an optical coupler circuit being coupled between a primary side and a secondary side of the switching power supply, the primary control circuit including: a driving pulse signal generating circuit, coupled to a power switch of the switching power supply, and configured to generate a driving pulse signal to control the turning on and off of the power switch; and a primary mode control circuit, configured to receive a notification signal, and control, on the basis of the notification signal, a primary side control chip to change an operation mode.

In some embodiments, the primary mode control circuit includes: a third second-mode-maintaining control circuit, configured to output, at the primary side control chip, the driving pulse signal when the primary side control chip acquires an output undervoltage signal indicating that an output voltage is in an undervoltage state, and adjust output of the output voltage switching power supply according to the driving pulse signal, so that the switching power supply is in the second mode.

In some embodiments, the primary mode control circuit further includes: a second determination circuit, configured to determine whether an output voltage in a secondary side control chip is less than a first preset output voltage, and when the output voltage is less than the first preset output voltage, transmit the output undervoltage signal to the primary side control chip.

In some embodiments, the primary mode control circuit further includes: a second blocking circuit, configured to block, when the primary side control chip is within a preset resonance time, detection on the primary side control chip.

In some embodiments, the primary mode control circuit further includes: a fourth second-mode-maintaining control circuit, configured to output, at the primary side control chip, the driving pulse signal when an input voltage of an auxiliary winding of the primary side is adjusted to be within a preset range, and adjust the output of the switching power supply according to the driving pulse signal and a relationship between the input voltage and the output voltage, so that the switching power supply is in the second mode.

In some embodiments, the primary mode control circuit further includes: a second adjusting circuit, configured to adjust the output voltage according to a turn ratio relationship between the input voltage and the output voltage, wherein the turn ratio relationship is a ratio of the number of turns of a secondary winding of the transformer of the secondary side to the number of turns of the auxiliary winding of the primary side.

The standby method for a switching power supply, the switching power supply, the primary control circuit, and the secondary control circuit provided in the present invention are described above in detail. The embodiments in the specification are described in a progressive manner. Each of the embodiments focuses on differences from other embodiments, and for identical or similar parts between the embodiments, reference may be made to each other. The apparatus disclosed in the embodiments is described briefly because the apparatus corresponds to the method disclosed in the embodiments, and for related parts, reference may be made to the description of the method. It should be pointed out that those of ordinary skill in the art can further make several improvements and modifications to the present invention without departing from the principle of the present invention, and the improvements and modifications also fall within the scope of protection of the claims of the present invention.

It should also be noted that in the present specification, relational terms such as first, second, etc., are merely used to distinguish an entity or operation from another entity or operation, and it is not necessarily required or implicated that any such actual relationship or order is present between these entities or operations. In addition, the term “include,” “comprise,” or any other variation thereof is intended to encompass a non-exclusive inclusion, so that a process, method, article, or device that includes a series of elements includes not only those elements but also other elements not explicitly listed, or elements that are inherent to such a process, method, article, or device. The element defined by the statement "including one . . . ", when without further limitation, does not preclude the presence of additional identical elements in the process, method, article, or device that includes the element.

The invention claimed is:

1. A standby method for a switching power supply, characterized by being applied to a switching power supply provided with an optical coupler circuit, the standby method comprising:

upon detecting a mode control signal indicating that a load device power supply demand is greater than a preset value, entering, by the switching power supply, a first mode, and controlling output voltage of the switching power supply by means of the optical coupler circuit;

upon detecting a mode control signal indicating that the load device power supply demand is less than or equal to the preset value, entering, by the switching power supply, a second mode, turning off a bias current of the optical coupler circuit, generating, according to the bias current of the optical coupler circuit, a notification signal indicating that the switching power supply has entered the second mode, controlling, according to the notification signal maintained for a first preset time length, a secondary side control chip to enter the second mode, and controlling the output voltage of the switching power supply by means of a driving pulse signal, so as to reduce bias currents of a primary side and a secondary side of the switching power supply, and reduce standby power consumption of the switching power supply; and when a primary side control chip acquires that a level signal of a voltage signal outputted by the optical coupler circuit has been inverted and a retention time length of the inverted level signal has reached a time threshold, controlling the primary side control chip to enter the second mode.

2. The standby method for the switching power supply of claim 1, wherein the time threshold is greater than a maximum value of a duration of the level signal in the first mode, and the secondary side control chip controls a duration of the mode control signal indicating that the load device power supply demand is less than or equal to the preset value to be greater than the time threshold.

3. The standby method for the switching power supply of claim 1, wherein the turning off a bias current of the optical coupler circuit, and controlling the output voltage of the switching power supply by means of a driving pulse signal comprises:

when a primary side control chip acquires an output undervoltage signal indicating that the output voltage is in an undervoltage state, outputting the driving pulse signal at the primary side control chip; and adjusting the output voltage of the switching power supply of the driving pulse signal, so that the switching power supply is in the second mode.

4. The standby method for the switching power supply of claim 1, wherein after the controlling the output voltage of the switching power supply by means of a driving pulse signal, the method further comprises:

when a secondary side control chip acquires the mode control signal indicating that the load device power supply demand is greater than the preset value, outputting, by means of a transformer, a wake-up signal which has a preset frequency and which indicates exiting the second mode, controlling the secondary side control chip to stop outputting the wake-up signal, and controlling, according to the wake-up signal, the secondary side control chip to exit the second mode.

5. The standby method for the switching power supply of claim 4, wherein after the outputting, by means of a transformer, the wake-up signal which has a preset frequency and which indicates exiting the second mode, the method further comprises:

when it is determined that the preset frequency of the wake-up signal is less than a frequency threshold, controlling a primary side control chip to exit the second mode.

6. The standby method for the switching power supply of claim 4, wherein after the controlling the output voltage of the switching power supply by means of a driving pulse signal, the method further comprises:

when a level signal of an voltage signal outputted by the optical coupler circuit and acquired by a primary side control chip is inverted, and a retention time length of the inverted level signal reaches a second preset time length, controlling the secondary side control chip to stop outputting the wake-up signal, and controlling, according to the wake-up signal, the primary side control chip to exit the second mode.

7. The standby method for the switching power supply of claim 1, wherein the turning off a bias current of the optical coupler circuit, and controlling the output voltage of the switching power supply by means of a driving pulse signal comprises:

when an input voltage of an auxiliary winding of the primary side is adjusted to be within a preset range, outputting the driving pulse signal at a primary side control chip; and adjusting the output of the switching power supply according to the driving pulse signal and a relationship between the input voltage and the output voltage, so that the switching power supply is in the second mode.

8. A switching power supply comprising:

an optical coupler circuit coupled between a primary side and a secondary side;

a mode signal generating circuit, configured to measure a load device power supply demand of the switching power supply, and generate a second mode control signal when the load device power supply demand is less than or equal to a preset value;

an optical coupler control circuit, which controls, according to the second mode control signal, a bias current of the optical coupler circuit to be turned off;

a switching power supply output control circuit, configured to generate a first mode control signal when the load device power supply demand is greater than the preset value, control, according to the first mode control signal, the switching power supply to enter a first mode, control a output voltage of the switching power supply by means of the optical coupler circuit, control, according to the second mode control signal, the switching power supply to enter a second mode, generate, according to the bias current of the optical coupler circuit, a notification signal indicating that the switching power supply has entered the second mode, controlling, according to the notification signal maintained for a first preset time length, a secondary side control chip to enter the second mode, and control the output voltage of the switching power supply by means of a driving pulse signal, so as to reduce bias currents of the primary side and the secondary side of the switching power supply, and reduce standby power consumption of the switching power supply; and when a primary side control chip acquires that a level signal of a voltage signal outputted by the optical coupler circuit has been inverted and a retention time length of the inverted level signal has reached a time threshold, controlling the primary side control chip to enter the second mode.

9. The switching power supply of claim 8, wherein the switching power supply output control circuit comprises:

a notification signal control circuit, configured to generate the notification signal upon receiving the second mode control signal, and configured to notify a primary side control chip to enter or exit the second mode, so that the switching power supply controls the output voltage of the switching power supply by means of the driving pulse signal, so as to reduce the bias currents of the primary side and the secondary side of the switching power supply, and reduce the standby power consumption of the switching power supply; and a primary mode control circuit, configured to receive the notification signal, and control, based on the notification signal, a primary side control chip to change an operation mode, the operation mode comprising the first mode or the second mode, wherein when the load device power supply demand is greater than the preset value, the switching power supply enters the first mode, and the output voltage of the switching power supply is controlled by means of the optical coupler circuit.

10. The switching power supply of claim 9, wherein the notification signal control circuit comprises:

a second-mode-entering control circuit, configured to generate, according to the bias current of the optical coupler circuit, the notification signal indicating that the switching power supply has entered the second mode.

11. The switching power supply of claim 10, wherein the notification signal control circuit further comprises:

a secondary second-mode-exiting control circuit, configured to output, by means of a transformer when the secondary side control chip acquires the first mode control signal indicating that the load device power supply demand is greater than the preset value, a wake-up signal which has a preset frequency and which indicates exiting the second mode, control the secondary side control chip to stop outputting the wake-up signal, and control, according to the wake-up signal, the secondary side control chip to exit the second mode.

12. The switching power supply of claim 9, wherein the time threshold is greater than a maximum value of a duration of the level signal in the first mode, and a secondary side control chip controls a duration of the second mode control signal indicating that the load device power supply demand is less than or equal to the preset value to be greater than the time threshold.

13. The switching power supply of claim 9, wherein the notification signal control circuit further comprises:

a secondary second-mode-exiting control circuit, configured to control, according to the notification signal maintained for a third preset time length, a secondary side control chip to exit the second mode.

14. A secondary control circuit of a switching power supply comprising:

an optical coupler circuit coupled between a primary side and a secondary side of the switching power supply;

a mode signal generating circuit, configured to measure a load device power supply demand of the switching power supply, and generate a second mode control signal when the load device power supply demand is less than or equal to a preset value;

an optical coupler control circuit, which controls, according to the second mode control signal, a bias current of the optical coupler circuit to be turned off; and a notification signal control circuit, which generates a notification signal upon receiving the second mode control signal, and is configured to notify a primary side control chip to enter or exit a second mode, so that the switching power supply controls output of the switching power supply by means of a driving pulse signal, so as to reduce bias currents of the primary side and the secondary side of the switching power supply, and reduce standby power consumption of the switching power supply, wherein the notification signal control circuit further comprises:

a second-mode-entering control circuit, configured to control, when the primary side control chip acquires that a level signal of a voltage signal outputted by the optical coupler circuit has been inverted and a retention time length of the inverted level signal has reached a time threshold, the primary side control chip to enter the second mode, wherein the time threshold is greater than a maximum value of a duration of the level signal in a first mode, and a secondary side control chip controls a duration of the second mode control signal indicating that the load device power supply demand is less than or equal to the preset value to be greater than the time threshold.

15. The secondary control circuit of the switching power supply of claim 14, wherein the notification signal control circuit comprises:

a second second-mode-entering control circuit, configured to generate, according to the bias current of the optical coupler circuit, the notification signal indicating that the switching power supply has entered the second mode, and control, according to the notification signal maintained for a first preset time length, a secondary side control chip to enter the second mode.

16. The secondary control circuit of the switching power supply of claim 14, wherein the notification signal control circuit further comprises:

a secondary second-mode-exiting control circuit, configured to output, by means of a transformer when a secondary side control chip acquires a first mode control signal indicating that the load device power supply demand is greater than the preset value, a wake-up signal which has a preset frequency and which indicates exiting the second mode, control a secondary side control chip to stop outputting the wake-up signal, and control, according to the wake-up signal, the secondary side control chip to exit the second mode.

17. The secondary control circuit of the switching power supply of claim 16, wherein the notification signal control circuit further comprises:

a primary second-mode-exiting control circuit, configured to control, when a level signal of an voltage signal outputted by the optical coupler circuit and acquired by the primary side control chip is inverted and a retention time length of the inverted level signal reaches a second preset time length, the secondary side control chip to stop outputting the wake-up signal, and control, according to the wake-up signal, the primary side control chip to exit the second mode.

18. The secondary control circuit of the switching power supply of claim 14, wherein the notification signal control circuit further comprises:

a secondary second-mode-exiting control circuit, configured to control, according to the notification signal maintained for a third preset time length, a secondary side control chip to exit the second mode.

* * * * *